(12) United States Patent
Markoski et al.

(10) Patent No.: US 8,158,300 B2
(45) Date of Patent: Apr. 17, 2012

(54) PERMSELECTIVE COMPOSITE MEMBRANE FOR ELECTROCHEMICAL CELLS

(75) Inventors: Larry J. Markoski, Raleigh, NC (US); Dilip Natarajan, Cary, NC (US); Alex Primak, Morrisville, NC (US)

(73) Assignee: INI Power Systems, Inc., Cary, NC (US)

( * ) Notice: Subject to any disclaimer, the term of this patent is extended or adjusted under 35 U.S.C. 154(b) by 686 days.

(21) Appl. No.: 11/533,210

(22) Filed: Sep. 19, 2006

(65) Prior Publication Data

US 2008/0070083 A1   Mar. 20, 2008

(51) Int. Cl.
*H01M 8/10*   (2006.01)
*H01M 8/00*   (2006.01)

(52) U.S. Cl. .................. 429/480; 429/481; 429/400
(58) Field of Classification Search ............ 429/44
See application file for complete search history.

(56) References Cited

U.S. PATENT DOCUMENTS

| | | |
|---|---|---|
| 3,357,861 A | 12/1967 | Hunger |
| 3,849,275 A | 11/1974 | Candor |
| 3,902,916 A | 9/1975 | Warszawski |
| 3,992,223 A | 11/1976 | Gutbier |
| 4,066,526 A | 1/1978 | Yeh |
| 4,311,594 A | 1/1982 | Peny |
| 4,614,575 A | 9/1986 | Juda et al. |
| 4,652,504 A | 3/1987 | Ando |
| 4,722,773 A | 2/1988 | Plowman et al. |
| 4,732,822 A | 3/1988 | Wright et al. |
| 4,732,823 A | 3/1988 | Ito et al. |
| 4,783,381 A | 11/1988 | Tytgat et al. |
| 5,185,218 A | 2/1993 | Brokman et al. |
| 5,290,414 A | 3/1994 | Marple |
| 5,316,629 A | 5/1994 | Clifford et al. |
| 5,413,881 A | 5/1995 | Licht et al. |
| 5,534,120 A | 7/1996 | Ando et al. |
| 5,599,638 A | 2/1997 | Surampudi et al. |
| 5,648,183 A | 7/1997 | Licht et al. |
| 5,846,670 A | 12/1998 | Watanabe |
| 5,858,567 A | 1/1999 | Spear, Jr. et al. |
| 5,863,671 A | 1/1999 | Spear, Jr. et al. |
| 5,952,118 A | 9/1999 | Ledjeff et al. |

(Continued)

FOREIGN PATENT DOCUMENTS

CA    2 473 329    10/2009

(Continued)

OTHER PUBLICATIONS

Chen et al., "Ion exchange resin/polystyrene sulfonate composite membranes for PEM fuel cells", Journal of Membrane Science, 243, pp. 327-333, 2004.

(Continued)

*Primary Examiner* — Barbara Gilliam
*Assistant Examiner* — Adam A Arciero
(74) *Attorney, Agent, or Firm* — Evan Law Group LLC

(57) ABSTRACT

An electrochemical cell includes an anode including an anode catalyst, a cathode including a cathode catalyst, and a first set of proton-conducting metal nanoparticles between the anode and the cathode, such that the first set of proton-conducting metal nanoparticles is not in contact with the anode. The cathode may be a cathode assembly including a gas diffusion electrode, a cathode catalyst on the gas diffusion electrode, and proton-conducting metal nanoparticles on the cathode catalyst.

15 Claims, 12 Drawing Sheets

U.S. PATENT DOCUMENTS

| | | |
|---|---|---|
| 6,007,931 A | 12/1999 | Fuller et al. |
| 6,013,385 A | 1/2000 | DuBose |
| 6,024,848 A | 2/2000 | Dufner et al. |
| 6,039,853 A | 3/2000 | Gestermann et al. |
| 6,054,427 A | 4/2000 | Winslow |
| 6,103,413 A | 8/2000 | Hinton et al. |
| 6,110,613 A | 8/2000 | Fuller |
| 6,136,272 A | 10/2000 | Weigl et al. |
| 6,242,123 B1 | 6/2001 | Nezu et al. |
| 6,255,012 B1 | 7/2001 | Wilson et al. |
| 6,312,846 B1 | 11/2001 | Marsh et al. |
| 6,432,918 B1 | 8/2002 | Winslow |
| 6,437,011 B2 | 8/2002 | Steck et al. |
| 6,444,343 B1 | 9/2002 | Prakash et al. |
| 6,447,943 B1 | 9/2002 | Peled et al. |
| 6,472,091 B1 | 10/2002 | Konrad et al. |
| 6,485,851 B1 | 11/2002 | Narayanan et al. |
| 6,492,047 B1 | 12/2002 | Peled et al. |
| 6,497,975 B2 | 12/2002 | Bostaph et al. |
| 6,528,200 B1 | 3/2003 | Yoshitake et al. |
| 6,607,655 B2 | 8/2003 | Lowe et al. |
| 6,638,654 B2 | 10/2003 | Jankowksi et al. |
| 6,641,948 B1 | 11/2003 | Ohlsen et al. |
| 6,713,206 B2 | 3/2004 | Markoski et al. |
| 6,715,899 B1 | 4/2004 | Wu |
| 6,716,548 B1 | 4/2004 | Kaliaguine et al. |
| 6,720,105 B2 | 4/2004 | Ohlsen et al. |
| 6,727,016 B2 | 4/2004 | Bostaph et al. |
| 6,808,840 B2 | 10/2004 | Mallari et al. |
| 6,811,916 B2 | 11/2004 | Mallari et al. |
| 6,852,443 B1 | 2/2005 | Ohlsen |
| 6,871,844 B2 | 3/2005 | Yan et al. |
| 6,890,680 B2 | 5/2005 | Beckmann et al. |
| 6,893,763 B2 | 5/2005 | Fan et al. |
| 6,911,411 B2 | 6/2005 | Cox et al. |
| 6,924,058 B2 | 8/2005 | Ohlsen et al. |
| 6,960,285 B2 | 11/2005 | Schoeniger et al. |
| 7,014,944 B2 | 3/2006 | Kordesch et al. |
| 7,067,216 B2 | 6/2006 | Yan et al. |
| 7,087,333 B2 | 8/2006 | Schäfer |
| 7,090,793 B2 | 8/2006 | Ma et al. |
| 7,205,064 B2 | 4/2007 | Markoski et al. |
| 7,252,898 B2 | 8/2007 | Markoski et al. |
| 7,635,530 B2 | 12/2009 | Kenis et al. |
| 7,651,797 B2 | 1/2010 | Markoski et al. |
| 7,901,817 B2 | 3/2011 | Markoski et al. |
| 8,119,305 B2 | 2/2012 | Markoski et al. |
| 2001/0033960 A1 | 10/2001 | Cavalca et al. |
| 2001/0041283 A1* | 11/2001 | Hitomi ............................ 429/42 |
| 2001/0053472 A1 | 12/2001 | Edlund |
| 2002/0015868 A1 | 2/2002 | Surampudi et al. |
| 2002/0028372 A1 | 3/2002 | Ohlsen et al. |
| 2002/0031695 A1 | 3/2002 | Smotkin |
| 2002/0041991 A1 | 4/2002 | Chan et al. |
| 2002/0083640 A1 | 7/2002 | Finkelshtain et al. |
| 2002/0091225 A1 | 7/2002 | McGrath et al. |
| 2002/0127454 A1 | 9/2002 | Narang et al. |
| 2003/0003336 A1 | 1/2003 | Colbow et al. |
| 2003/0003341 A1 | 1/2003 | Kinkelaar et al. |
| 2003/0003348 A1 | 1/2003 | Hanket |
| 2003/0091883 A1 | 5/2003 | Peled et al. |
| 2003/0096151 A1 | 5/2003 | Blunk et al. |
| 2003/0134163 A1 | 7/2003 | Markoski et al. |
| 2003/0148159 A1 | 8/2003 | Cox et al. |
| 2003/0170524 A1 | 9/2003 | Kordesch et al. |
| 2003/0175581 A1 | 9/2003 | Kordesch et al. |
| 2003/0194598 A1 | 10/2003 | Chan |
| 2003/0198852 A1 | 10/2003 | Masel et al. |
| 2003/0219640 A1 | 11/2003 | Nam et al. |
| 2003/0231004 A1 | 12/2003 | Takahashi et al. |
| 2004/0018415 A1 | 1/2004 | Lai et al. |
| 2004/0039148 A1 | 2/2004 | Cao et al. |
| 2004/0045816 A1 | 3/2004 | Masel et al. |
| 2004/0058217 A1* | 3/2004 | Ohlsen et al. ................... 429/34 |
| 2004/0062965 A1 | 4/2004 | Morse et al. |
| 2004/0072047 A1 | 4/2004 | Markoski et al. |
| 2004/0084789 A1 | 5/2004 | Yan et al. |
| 2004/0096721 A1 | 5/2004 | Ohlsen et al. |
| 2004/0101740 A1 | 5/2004 | Sanders |
| 2004/0115518 A1 | 6/2004 | Masel et al. |
| 2004/0121208 A1 | 6/2004 | James et al. |
| 2004/0121209 A1 | 6/2004 | Yan et al. |
| 2004/0126666 A1 | 7/2004 | Cao et al. |
| 2004/0151965 A1 | 8/2004 | Forte et al. |
| 2004/0209153 A1 | 10/2004 | Peled et al. |
| 2004/0209154 A1 | 10/2004 | Ren et al. |
| 2004/0265681 A1 | 12/2004 | Markoski et al. |
| 2005/0001352 A1 | 1/2005 | Ma et al. |
| 2005/0003263 A1 | 1/2005 | Mallari et al. |
| 2005/0008923 A1 | 1/2005 | Malhotra |
| 2005/0026026 A1 | 2/2005 | Yen et al. |
| 2005/0053826 A1* | 3/2005 | Wang et al. ..................... 429/44 |
| 2005/0074657 A1 | 4/2005 | Rusta-Sallehy et al. |
| 2005/0084737 A1 | 4/2005 | Wine et al. |
| 2005/0084738 A1 | 4/2005 | Ohlsen et al. |
| 2005/0089748 A1 | 4/2005 | Ohlsen et al. |
| 2005/0123812 A1 | 6/2005 | Okamoto |
| 2005/0136309 A1 | 6/2005 | Masel et al. |
| 2005/0161342 A1 | 7/2005 | Carson et al. |
| 2005/0191541 A1 | 9/2005 | Gurau et al. |
| 2005/0202305 A1* | 9/2005 | Markoski et al. ............... 429/38 |
| 2005/0252784 A1 | 11/2005 | Choban et al. |
| 2006/0003217 A1 | 1/2006 | Cohen et al. |
| 2006/0035136 A1 | 2/2006 | Markoski et al. |
| 2006/0040146 A1 | 2/2006 | Yamaguchi |
| 2006/0040147 A1 | 2/2006 | Yamaguchi |
| 2006/0059769 A1 | 3/2006 | Masel et al. |
| 2006/0078785 A1 | 4/2006 | Masel et al. |
| 2006/0088744 A1 | 4/2006 | Markoski et al. |
| 2006/0141328 A1 | 6/2006 | Johnston et al. |
| 2006/0147785 A1 | 7/2006 | Chiang et al. |
| 2006/0210867 A1 | 9/2006 | Kenis |
| 2006/0228622 A1 | 10/2006 | Cohen et al. |
| 2007/0020491 A1 | 1/2007 | Ogburn |
| 2007/0190393 A1 | 8/2007 | Markoski et al. |
| 2008/0070083 A1 | 3/2008 | Markoski et al. |
| 2008/0248343 A1 | 10/2008 | Markoski et al. |
| 2008/0274393 A1 | 11/2008 | Markoski et al. |
| 2009/0035644 A1 | 2/2009 | Markoski et al. |
| 2010/0196800 A1 | 8/2010 | Markoski et al. |
| 2011/0003226 A1 | 1/2011 | Markoski et al. |
| 2011/0008713 A1 | 1/2011 | Markoski et al. |

FOREIGN PATENT DOCUMENTS

| | | |
|---|---|---|
| EP | 0 252 559 | 6/1991 |
| EP | 0 664 930 B1 | 5/1996 |
| EP | 1 818 654 A1 | 8/2007 |
| EP | 1 819 004 A1 | 8/2007 |
| GB | 1018825 | 2/1966 |
| GB | 1 416 483 | 12/1975 |
| JP | 46-16452 | 5/1971 |
| JP | 63 313472 A | 12/1988 |
| JP | 4-284889 | 10/1992 |
| JP | 10-211447 A | 8/1998 |
| JP | 2005-515602 | 5/2005 |
| KR | 10-2008-0045416 | 5/2008 |
| WO | WO 94/09524 | 4/1994 |
| WO | WO 96/12317 | 4/1996 |
| WO | WO 98/06145 | 2/1998 |
| WO | WO 00/15872 | 3/2000 |
| WO | WO 01/37357 | 5/2001 |
| WO | WO 01/39307 A2 | 5/2001 |
| WO | WO 01/54216 A2 | 7/2001 |
| WO | WO 01/94450 A2 | 12/2001 |
| WO | WO 02/11226 A2 | 2/2002 |
| WO | WO 03/002247 A1 | 1/2003 |
| WO | WO 03/009410 A2 | 1/2003 |
| WO | WO 03/061037 | 7/2003 |
| WO | WO 03/106966 A2 | 12/2003 |
| WO | WO 2004/027891 A2 | 4/2004 |
| WO | WO 2004/027901 A2 | 4/2004 |
| WO | WO 2005/001975 | 1/2005 |
| WO | WO 2005/004262 | 1/2005 |
| WO | WO 2005/082024 | 9/2005 |
| WO | WO 2005/088759 A2 | 9/2005 |
| WO | WO 2006/101967 | 9/2006 |

| WO | WO 2007013880 | 2/2007 |
| WO | WO 2007/095492 | 8/2007 |
| WO | WO 2008/122042 | 10/2008 |

OTHER PUBLICATIONS

Granados-Focil et al., "Polyphenylene Sulfonic Acid: a new PEM", http://www1.eere.energy.gov/hydrogenandfuelcells/pdfs/hi_tem_pems_talk.pdf, 26 pages, 2003.

Jiang et al., "$CO_2$ Crossover Through a Nafion Membrane in a Direct Methanol Fuel Cell", Electrochemical and Solid-State Letters, 5 (7), pp. A156-A159, 2002.

Service, "New Polymer May Rev Up the Output of Fuel Cells Used to Power Cars", Science, vol. 312, p. 35, 2006.

Thomas et al., "Fuel Cells—Green Power", Los Alamos National Laboratory, http://www.scied.science.doe.gov/nmsb/hydrogen/Guide%20to%20Fuel%20Cells.pdf, 36 pages, 1999.

Hejze et al., "Preparation of Pd-coated polymer electrolyte membranes and their application in direct methanol fuel cells", Journal of Power Sources, 140, pp. 21-27, 2005.

Kordesch et al, "Direct methanol-air fuel cells with membranes plus circulating electrolyte", Journal of Power Sources, 96, pp. 200-203, 2001.

Li et al., "An improved palladium-based DMFCs cathode catalyst", Chem. Commun., pp. 2776-2777, 2004.

Peled et al., "0.5 W/cm$^2$ Direct Methanol-Air Fuel Cell", Electrochemical and Solid-State Letters, 7 (12), pp. A507-A510, 2004.

Baker, R.W. "Membrane Technology," Encyclopedia of Polymer Science and Technology, vol. 3, pp. 184-249, 2001.

Kim et al., "Non-Naifion Membrane Electrode Assemblies", Los Alamos National Laboratory, http://www.hydrogen.energy.gov/pdfs/review06/fc_3_kim.pdf, pp. 1-24, 2005.

Shim et al., Naifion-impregnated polyethylene-terephthalate film used as the electrolyte for direct methanol fuel cells, Electrochimica Acta, 50, pp. 2385-2391, 2005.

"Celtec® V-Membrane for DMFC Applications", PEMAS Fuel Cell Technologies, 6 pages, printed Jul. 19, 2005.

Rozière et al., "Non-Fluorinated Polymer Materials for Proton Exchange Membrane Fuel Cells", Annu. Rev. Mater. Res., 33, pp. 503-555, 2003.

Shim et al., "Electrochemical Acceleration of Hydrogen Transfer Through a Methanol Impermeable Metallic Barrier", Journal of the Electrochemical Society, 150 (12), pp. A1583-A1588, 2003.

Tang et al., "Modification of Nafion™ membrane to reduce methanol crossover via self-assembled Pd nanoparticles", Materials Letters, 59, pp. 3766-3770, 2005.

Peled et al., "A Direct Methanol Fuel Cell Based on a Novel Low-Cost Nanoporous Proton-Conducting Membrane", Electrochemical and Solid-State Letters, 3 (12), pp. 525-528, 2000.

Peled et al., "Novel approach to Recycling Water and Reducing Water Loss in DMFCs", Electrochemical and Solid-State Letters, 6 (12), pp. A268-A271, 2003.

Blum et al., "Water-neutral micro direct-methanol fuel cell (DMFC) for portable applications", Journal of Power Sources, 117, pp. 22-25, 2003.

Zhu et al., "The behavior of palladium catalysts in direct formic acid fuel cells", Journal of Power Sources, 139, pp. 15-20, 2005.

Sigracet, GDL 24 & 25 Series Gas Diffusion Layer, product information, SGL Carbon Group, 2 pages, 2004.

Choi et al., "Modification of proton conducting membrane for reducing methanol crossover in a direct-methanol fuel cell", Journal of Power Sources, 96, pp. 411-414, 2001.

Pu et al., "A Methanol Impermeable Proton Conducting Composite Electrolyte System", Journal of the Electrochemical Society, 142, pp. L119-L120, 1995.

Kim et al., "Evaluation of a palladinized Nafion™ for direct methanol fuel cell application", Electrochimica Acta, 49, pp. 3227-3234, 2004.

Halliday. et al., "Fundamentals of Physics", Extended Third Edition, pp. 662-685, 1988.

Thomas et al., "Fuel Cells—Green Power", Los Alamos National Laboratory, http://www.scied.science.doe.gov/nmsb/hydrogen/Guide%20to%20Fuel%20Cells.pdf, 36 pages, 1999.

Peled et al., "0.5 W/cm$_2$ Direct Methanol-Air Fuel Cell", Electrochemical and Solid-State Letters, 7 (12), pp. A507-A510, 2004.

Shim et al., Naifion-impregnated polyethylene-terephthalate film used as the electrolyte for direct methanol fuel cells, Electrochimica Acta, 50, pp. 2385-2391, 2005.

Peled et al., "Novel approach to Recycling Water and Reducing Water Loss in DMFCs", Electrochemical nd Solid-State Letters, 6 (12), pp. A268-A271, 2003.

Osmonics The Filtration Spectrum, Osmonics, Inc., Minnetonka, Minnesota, 1 page, (1984).

Xia, S.J. et al., Proceedings of the 207$^{th}$ Meeting of the Electrochemical Society, Abstract #779, Quebec City, Canada, May 21-25, (2005).

Choban, E.R. et al., "Microfluidic Fuel Cells That Lack A PEM", Power Sources Proceedings, vol. 40, pp. 317-320, (2002).

Choban, E.R. et al., "Membraneless Fuel Cell Based on Laminar Flow," ASME Fuel Cell Science, Engineering and Technology Proceedings, pp. 261-265, (2003).

Ferrigno, R. et al., "Membraneless Vanadium Redox Fuel Cell Using Laminar Flow", J. Am. Chem. Soc., vol. 124, pp. 12930-12931, (2002).

Choban, E.R. et al., "Characterization of Limiting Factors in Laminar Flow-Based Membraneless Microfuel Cells", Electrochemical and Solid-State Letters, 8 (7), pp. A348-A352, (2005).

Choban, E.R. et al., "Microfluidic Fuel Cell Based on Laminar Flow", J. Power Sources, 128, pp. 54-60, (2004).

www.whatman.com "Leadership in separations technology for the life Sciences", 1 page, (2009).

Jankowski, A.F. et al., "Micro-Fabricated Thin-film Fuel Cells for Portable Power Requirements", Spring Meeting of the Materials Research Society, San Francisco, CA, Apr. 1-5, 2002, 7 pages, (2002).

Chan, K-Y et al., "Meniscus behavior and oxygen reduction in tapered pore gas diffusion electrodes", Electrochimica Acta, vol. 33, No. 12, pp. 1767-1773, (1988).

Chan, K-Y et al., "A wedge-meniscus model of Gas-Diffusion Electrodes", Electrochimica Acta, 32, 8, pp. 1227-1232, (1987).

Waszczuk, P. et al., "Methanol Electrooxidation on Platinum/Ruthenium Nanoparticle Catalysts", Journal of Catalysis, 203, pp. 1-6, (2001).

Peng, F.Z. et al., "A new ZVS bidirectional dc-dc converter for fuel cell and battery application," IEEE Transactions on Power Electronics, 19, 1, pp. 54-65, (2004).

Krein, P.T. et al., "Low cost inverter suitable for medium-power fuel cells," IEEE Power Electronics Specialists Conference, vol. 1, pp. 321-326, (2002).

Cygan, P.J. et al., "Hybrid Power Sources for Military Applications," The Eighteenth Annual Battery Conference on Applications and Advances, pp. 85-90, (1998).

Jarvis, L.P. et al., "Hybrid Power Source for Manportable Applications," IEEE Aerospace and Electronic Systems Magazine, 18, 1, pp. 13-16, (2003).

Atwater, T.B. et al., "Man portable power needs of the 21$^{st}$ century," Journal of Power Sources, vol. 91, No. 1, pp. 27-36, (2000).

Jarvis, L.P. et al., "Fuel cell/Lithium-ion battery hybrid for manportable applications," The Seventeenth Annual Battery Conference on Applications and Advances, pp. 69-72, (2002).

Gao, L. et al. "An actively controlled fuel cell/battery to meet pulsed power demands," Journal of Power Sources, 130, pp. 202-207, (2004).

Zheng, J.P. et al., "Hybrid power sources for pulsed current applications," IEEE Transactions on Aerospace and Electronic Systems, vol. 37, pp. 288-292, (2001).

Jiang, Z. et al., "Design and experimental tests of control strategies for active hybrid fuel cell/battery power sources," Journal of Power Sources, 130, pp. 163-171 (2004).

Acharya, P. et al., "An advanced fuel cell simulator," IEEE Applied Power Electronics Conference, pp. 1554-1558, (2004).

Weigl, B.H. et al., "Microfluidic diffusion-based separation and detection", Science, 283, pp. 346-347, (1999).

Kenis, P.J.A. et al., "Microfabrication Inside Capillaries Using Multiphase Laminar Flow Patterning", Science, vol. 285, pp. 83-85, (1999).

Wesseler, E.P. et al., "The Solubility of Oxygen in Highly Fluorinated Liquids", Journal of Fluorine Chemistry, 9, pp. 137-146, (1977).

Riess, J.G. et al., "Solubility and Transport Phenomena in Perfluorochemicals Relevant to Blood Substitution and Other Biomedical Applications", Pure & Appl. Chem., vol. 54, No. 12, pp. 2383-2406, (1982).

International Search Report dated Oct. 25, 2006 for PCT application No. PCT/US05/05962.

Rice, C. et al., "Direct Formic Acid Fuel Cells", Journal of Power Sources, vol. 111, pp. 83-89, (2002).

Lu, G-Q et al., "Formic Acid Decomposition on Polycrystalline Platinum and Palladized Platinum Electrodes", J. Phys. Chem., vol. 103, pp. 9700-9711, (1999).

Waszczuk, P. et al., "A nanoparticle catalyst with superior activity for electrooxidation of formic acid", Electrochemistry Communications, vol. 4, pp. 599-603, (2002).

International Search Report dated Mar. 30, 2007 for PCT application No. PCT/US05/32990.

Park, S. et al., "Electrochemical Infrared Characterization of CO Domains on Ruthenium-Decorated Platinum Nanoparticles" J. Am. Chem. Soc. 125, pp. 2282-2290, (2003).

Babu, P.K. et al., "Electronic Alterations Caused by Ruthenium in Pt-Ru Alloy Nanoparticles as Revealed by Electrochemical NMR", J. Phys. Chem., 107, pp. 7595-7600, (2003).

Hentges, P.J. et al., "Planar tunneling spectroscopic studies of splitting vs. non-splitting of the zero-bias conductance peak in $YBa_2Cu_3O_7$—thin films", Physica C, 408-410, pp. 801-803, (2004).

Hentges, P.J. et al., "Solution-growth of ultra-thin, insulating layers of zirconia for passivation and tunnel junction fabrication on YBCO thin films", IEEE Transactions on Applied Superconductivity, v. 13, No. 2, pp. 801-804, (2003).

Greene, L.H. et al., "Planar tunneling spectroscopy of high-temperature superconductors: Andreev bound states and broken symmetries", Physica C, 387, pp. 162-168, (2003).

Greene, L.H. et al., "Detection and Control of Broken Symmetries with Andreev Bound State Tunneling Spectroscopy: Effects of Atomic-Scale Disorder", Physica C, 408-410, pp. 804-806, (2004).

Kimball, J.W. et al., "Issues with low-input-voltage boost converter design," IEEE Power Electronics Specialists Conference, Aachen, Germany, pp. 2152-2156, (2004).

Ismagilov, R.F. et al., "Experimental and theoretical scaling laws for transverse diffusive broadening in two-phase laminar flows in microchannels," Applied Physics Letters, vol. 76, No. 17, pp. 2376-2378, (2000).

Kenis, P.J.A. et al., "Microfabrication Inside Capillaries Using Multiphase Laminar Flow Patterning," Science, vol. 285, pp. 83-85, (1999).

Ismagilov, R.F. et al., "Pressure-driven laminar flow in tangential microchannels: an elastomeric microfluidic switch", Anal. Chem., 73, pp. 4682-4687, (2001).

Dobbs, B.G. et al., "A multiple-input dc-dc converter topology", IEEE Power Electronic Letters, vol. 1, No. 1, pp. 6-9, (2003).

Musunuri, S. et al., "Fabrication and Characterization of PDMA Inductors", IEEE Power Electronics Specialists Conference, Aachen, Germany, pp. 4460-4466, (2004).

Coutanceau, C. et al., "Radioactive Labeling Study and FTIR Measurements of Methanol Adsorption and Oxidation on Fuel Cell Catalysts", Fuel Cells, 2, pp. 153-158, (2002).

Jankowski A.F., et al., "Sputter Deposition of Metallic Sponges", 48th International Symposium on the American Vacuum Society, San Francisco, CA, Oct. 26-Nov. 2, 2001, 14 pages (2001).

Guo, J-W., et al., "Effect of Current collector corrosion made from Printed Circuit Board (PCB) on the degradation of self-breathing direct methanol fuel cell stack", Electrochimica Acta, 53, pp. 3056-3064, (2008).

Morse, J. et al., "An Integrated Microfluidic Fuel Cell System for Energy Conversion from Hydrocarbon Fuels", Electrochemical Society Spring Symposium, Philadelphia, PA, May 12-17, 2002, 1 page, (2002).

Park H.G. et al., "Transport in a Microfluidic Catalytic Reactor", Proceedings of HT2003, ASME Summer Heat Transfer Conference, Jul. 21-23, 2003, Las Vegas, Nevada, pp. 1-10, (2003).

Zhang, J. et al., "Electrochemical Measurement of $O_2$ Permeation Rate through Polymer Electrolyte Membranes", 216th ECS Meeting, Abstract #830, The Electrochemical Society, 1 page, (2009).

Chu, D. et al., Alkaline Membrane Electrolyte Fuel Cell Research and Development at the U.S. Army Research Laboratory, 216th ECS Meeting, Abstract #385, The Electrochemical Society, 1 page, (2009).

Jiang, R. et al., "Water and Fuel Crossover in a Direct Methanol Fuel Cell Stack", 212th ECS Meeting, Abstract #601, The Electrochemical Society, 1 page, (2007).

Jiang, R. et al., "A Palladium Deposited Nafion Membrane via Supercritical Carbon Dioxide (sc-$CO_2$) Medium for DMFCs", 207th ECS Meeting, Abstract #784, The Electrochemical Society,1 page, (2005).

Jiang, R. et al., "Sol-Gel Derived Nafion/Silica Hybrid Electrolyte Membranes for Direct Methanol Fuel Cells (DMFCs)", 207th ECS Meeting, Abstract #56, The Electrochemical Society, 1 page, (2005).

Jiang, R. et al., "Direct Methanol Fuel Cell System Performance: From Materials, Components, to System and Fuel Efficiency", 209th ECS Meeting, Abstract #1143, The Electrochemical Society, 1 page, (2006).

Jiang, R. et al., "Durability Evaluation of Direct Methanol Fuel Cells", 208th ECS Meeting, Abstract #1216, The Electrochemical Society, 1 page, (2005).

Jiang, R. et al., "Comparison of Several Research Approaches for Direct Methanol Fuel Cell Membranes", 208th ECS Meeting, Abstract #965, The Electrochemical Society, 1 page, (2005).

Jankowski, A.F. et al., Micro-Fabricated Thin-Film Fuel Cells for Portable Power Requirements, Mat. Res. Soc. Symp.Proc., vol. 730, pp. V4.2.1-V4.2.6, (2002).

Choban, E.R, et al, "Microfluidic fuel cell based on laminar flow", Journal of Power Sources, vol. 128, pp. 54-60, (2004).

International Search Report dated May 29, 2006 for application No. PCT/US2004/020597.

Kenis, P.J.A, et al, "Fabrication inside microchannels using fluid flow", Accounts of Chemical Research, vol. 33, No. 12, pp. 841-847, (2000).

E. Choban, et al, "Microfluidic Fuel Cells That Lack A PEM" Power Sources Proceedings, vol. 40, 2002, pp. 317-320, XP009031634.

R. Ferrigno, et al, "Membraneless Vanadium Redox Fuel Cell Using Laminar Flow" JACS Communications, vol. 124, 2002, pp. 12930-12931, XP002282850.

M. Mench, et al, "Design of Micro Direct Methanol Fuel Cell (Proceedings of the IMECE'01, Nov. 11-16, 2001)", 2001, The American Society of Mechanical Engineers, New York XP002282851.

S. C. Kelley, et al, "A Miniature Methanol/Air Polymer Electrolyte Fuel Cell", Electrochemical and Solid-State Letters, IEEE Service Center, Piscataway, NJ, vol. 3, No. 9, 2000, pp. 407-409, XP001023907.

Branebjerg et al, "Application of Miniature Analyzers from Microfluidic Components to uTAS," Proceedings of Micro Total Analysis Systems Conference, Netherlands, 1994, pp. 141-151.

Brody et al, "Diffusion-Based Extraction in a Microfabricated Device," Sensors and Actuators, 1997, pp. 13-18, vol. A58.

Carrette et al, "Fuel Cells-Findamentals and Applications," Fuel Cells, 2001, pp. 5-39, vol. I.

Duffy et al, "Rapid Prototyping of Microfluidic Systems in Poly(dimethylsiloxane)," Anal. Chem, 1998, pp. 4974-4984, vol. 70.

EG&G Services et al, Fuel Cell Handbook, Fifth Edition, 2000, U.S. Department of Energy, Office of Fossil Energy, National Energy Technology Laboratory, pp. I-xiii, 1-1 to 12-4.

Heinzel et al, "A Review of the State-of-the-Art of the Methanol Crossover in Direct Methanol Fuel Cells," J. Power Sources, 1999, pp. 70-74, vol. 84.

Kenis et al, "Microfabrication Inside Capillaries Using Multiphase Laminar Flow Patterning," Science, 1999, pp. 83-85, vol. 285.

Kim et al, "Diffusion-Based Sample Cleanup Microchip for Protein Analysis by Electrospray Ionization Mass Spectrometry," obtained at http://pittcon.omnibooksonline.comR001/papers/0226.pdf as of at least Jul. 24, 2001, 2 pages.

Pickett et al, "Ionic Mass Transfer in Parallel Plate Electrochemical Cells," J. Applied Electrochemistry, 1972, pp. 151-156, vol. 2.

Thomas et al, "Los Alamos National Laboratory Monograph LA-UR-99-3231," Fuel Cells: Green Power, 1999, pp. 1-33.

Waszczuk et al, "Methanol Electrooxidation on Platinum-RutheniumNanoparticle Catalysts," J. Catalysis, 2001, pp. 1-6, vol. 203.

Zhao et al, "Surface-Directed Liquid Flow Inside Microchannels," Science, 2001, pp. 1023-1026, vol. 291.

Markoski, "Summary of Knowledge About Laminar Flow Fuel Cells," 2002, 1 page.

Ro et al, "Sample Clean-Up Using Multiphase Laminar Microfluidics for Electrospray Ionization Mass Spectrometry," obtained at http://nanotech.osu.edu/abstracts/hahn.htm as of at least Jul. 24, 2001, 2 pages.

Delphion search conducted Oct. 23, 2002, for U.S. patents containing "perfluorocarbon" and fuel cell in the claims, 1 page.

Delphion search conducted Oct. 23, 2002, for U.S. patents containing fuel cell and oxygen carrier and "perfluror",1 page.

Delphion search conducted Aug. 23, 2002, for U.S. patents and applications containing "pefluoro" and "ballard",1 page.

Delphion search conducted Aug. 23, 2002, for U.S. patents containing "perflurocarbons", 2 pages.

Davis, "NISTIR 6848, Proposed Testing Methodology and Laboratory Facilities for Evaluating Residential Fuel Cell Systems," NIST, 2002, 14 pages.

Dupont Zonyl FS-62, Fluorosurfactant Information Sheet, 2001, 2 pages.

Riess et at, °Solubility and Transport Phenomena in Perfluorochemicals Relevant to Blood Substitution and Other Biomedical Applications, Pure & Appl. Chem, 1982, pp. 2383-2406, vol. 54.

Wesseler et al, The Solubility of Oxygen in Highly Fluorinated Liquids, J. Fluorine Chem, pp. 137-146, vol. 9.

Gang, X, et al, "Electrolyte additives for phosphoric acid fuel cells", Journal of the Electrochemical Society, vol. 140, No. 4, pp. 896-902, (1993).

International Search Report dated Dec. 13, 2005 for PCT application No. PCT/US2004/020342.

Kronberger, H, et al, "Reduction of oxygen from electrolyte emulsions with high oxygen contents", Journal of Power Sources, vol. 86, pp. 562-567, (2000).

International Search Report dated Jun. 21, 2004 for PCT application No. PCT/US2003/00226.

Kelley et al, "Miniature Fuel Cells Fabricated on Silicon Substrates," AIChE Journal 48, pp. 1071-1082, 2002.

Maynard et al, "Miniature fuel cells for portable power: Design considerations and challenges," J. Vac. Sci. Technol, B 20(4), pp. 1287-1297, 2002.

Steele et al, "Materials for fuel-cell technologies", Nature, vol. 414, pp. 345-352, 2001.

Lu et al, Development and characterization of a silicon-based micro direct methanol fuel cell, Electrochimica Acta 49, pp. 821-828, 2004.

Yeom et al, "Microfabrication and characterization of a silicon-based millimeter scale, PEM fuel cell operating with hydrogen, methanol, or formic acid," Sensors and Actuators, B, 107, pp. 882-891, 2005.

Lee et al, "Design and fabrication of a micro fuel cell array with "flip-flop" interconnection," Journal of Power Sources, 112, pp. 410-418, 2002.

Hahn et al, "Development of a planar micro fuel cell with thin film and micropatterning technologies," Journal of Power Sources, 131, pp. 73-78, 2004.

Mitrovski et al, "Microfluidic Devices for Energy Conversion: Planar Integration and Performance of a Passive, Fully Immersed H2-O2 Fuel Cell," Langmuir, 20, pp. 6974-6976, 2004.

Meyers et al, "Design considerations for miniaturized PEM fuel cells," Journal of Power Sources, 109, pp. 76-88 2002.

Yen et al, "A micro methanol fuel cell operating at near room temperature," Applied Physics Letters, vol. 83, No. 19, pp. 4056-4058, 2003.

Motokawa et al, MEMS-based design and fabrication of a new concept micro direct methanol fuel cell (µ-DMFC), Electrochemistry Communications, 6, pp. 562-565, 2004.

Ha, et al, "A miniature air breathing direct formic acid fuel cell," Journal of Power Sources, 128, pp. 119-124, 2004.

Ismagilov et al, "Experimental and theoretical scaling laws for transverse diffusive broadening in two-phase laminar flows in microchannels," Applied Physics Letters, vol. 76, No. 17, pp. 2376-2378, 2000.

Kamholz et al, "Quantitative Analysis of Molecular Interaction in a Microfluidic Channel: The T-Sensor," Anal. Chem, 71, pp. 5340-5347, 1999.

Krishnan et al, "Microfabricated reaction and separation systems", Current Opinion in Biotechnology 12, p. 92, 2001.

Zheng et al, "Formation of Arrayed Droplets by Soft Lithography and Two-Phase Fluid Flow, and Application in Protein Crystallization," Adv. Mater, 16, No. 15, 1365-1368, 2004.

Cohen et al, "Fabrication and preliminary testing of a planar membraneless microchannel fuel cell", J. Power Sources, 139, pp. 96-105, 2005.

Spendelow et al, "Electrooxidation of adsorbed CO in Pt(1 1 1) and Pt(1 1 1)/Ru in alkaline media and comparison with results from acidic media," Journal of Electroanalytical Chemistry, 568, pp. 215-224, 2004.

McLean et al, "An assessment of alkaline fuel cell technology," International Journal of Hydrogen Energy, 27, pp. 507-526, 2002.

Prabhuram et al, "Investigation of methanol oxidation on unsupported platinum electrodes in strong alkali and strong acid," Journal of Power Sources, 74, pp. 54-61, 1998.

Tripkovic et al, "Methanol oxidation at platinum electrodes in alkaline solution: comparison between supported catalysts and model systems," Journal of Electroanalytical Chemistry, 572, pp. 119-128, 2004.

Agel et al, "Characterization and use of anionic membranes for alkaline fuel cells," Journal of Power Sources, 101, pp. 267-274, 2001.

Wang et al, "A feasibility analysis for alkaline membrane direct methanol fuel cell: thermodynamic disadvantages versus kinetic advantages," Electrochemistry Communications, 5, 662-666, 2003.

Danks et al, "Alkaline anion-exchange radiation-grafted membranes for possible electrochemical application in fuel cells," J. Mater. Chem, 13, pp. 712-721, 2003.

Yu et al, "Development of direct methanol alkaline fuel cells using anion exchange membranes," Journal of Power Sources, 137, pp. 248-256, 2004.

Iwasita, "Electrocatalysis of methanol oxidation", Electrochim. Acta 47, pp. 3663-3674, 2002.

Barton et al, "Enzymatic Biofuel Cells for Implantable and Microscale Devices," Chem. Rev, 104, pp. 4867-4886, 2004.

Astris Energi Inc, "Advantages of the Alkaline Fuel Cell," can be located at: http://www.fuelcellmarkets.com/article_default_view.fcm?articleid=6194&subsite=912, 1 page, 2005.

Chen et al, "A Miniature Biofuel Cell," J. Am. Chem. Soc, 123, pp. 8630-8631, 2001.

Mano et al, "A Miniature Biofuel Cell Operating in a Physiological Buffer," J. Am. Chem. Soc, 124, pp. 12962-12963, 2002.

Kim et al, "A Miniature Membrane-less Biofuel Cell Operating under Physiological Conditions at 0.5 V," A. J. Electrochem. Soc. 150 (2), A209-A213, 2003.

Mano et al, "A Miniature Membraneless Biofuel Cell Operating at 0.36 V under Physiological Conditions," Journal of the Electrochemical Society, 150, 8, pp. A1136-A1138, 2003.

Mano et al, "Characteristics of a Miniature Compartment-less Glucose-O2 Biofuel Cell and Its Operation in a Living Plant," J. Am. Chem. Soc, 125, pp. 6588-6594, 2003.

Choban et al, "Characterization of Limiting Factors in Laminar Flow-Based Membraneless Microfuel Cells," Electrochemical and Solid State Letters,8 (7), pp. A348-A352, 2005.

Choban et al, "Membraneless laminar flow-based micro fuel cells operating in alkaline, acidic, and acidic/alkaline media," Electrochimica Acta, vol. 50, No. 27, pp. 5390-5398, 2005.

Cohen et al, "A Dual Electrolyte H2/O2 Planar Membraneless Microchannel Fuel Cell System with Open Circuit Potentials in Excess of 1.4 V," Lagmuir 21, pp. 3544-3550, available online Mar. 16, 2005.

Skoog et al, "Electrochemical Cells," Fundamentals of Analytical Chemistry, CBS College Publishing, 4th ed, p. 306, 1982.

FCTec, "Alkaline Fuel Cells (AFC)," can be located at: http://www.fctec.com/fctec_types_afc.asp, 1 page, 2005.

Tse, "Alkaline Fuel Cell," can be located at: http://www.visionengineer.com/env/al.php, 1 page, 2005.

Neah Power Systems, located at www.neahpower.com, 42 pages, 2003-2004.

INI Power Systems, located at www.inipower.com, 3 pages, 2004.

Yeom et al, "A Silicon Microfabricated Direct Formic Acid Fuel Cell," ASME Fuel Cell Science, Engineering and Technology Proceedings, pp. 267-272, 2003.

Yeom et al, "A Microscale Vapor-Fed Formic Acid Fuel Cell," Solid-State Sensors and Actuators Workshop, Hilton Head Island, SC, pp. 125-128, Jun. 2004.

Choban et al, "Membraneless Fuel Cell Based on Laminar Flow," ASME Fuel Cell Science, Engineering and Technology Proceedings, pp. 261-265, 2003.

Choban et al, "Microfluidic Fuel Cells That Lack a PEM," Power Sources Proceedings, 40, pp. 317-320, 2002.

Invitation to Pay Additional Fees and Partial Search Report dated Feb. 5, 2007 for PCT application No. PCT/US2006/009502, 9 Pages.

Chen, C.Y. et al., "Portable DMFC system with methanol sensor-less control", Journal of Power Sources, 167, pp. 442-449, (2007).

Livshits, V. et al., "Direct ethylene glycol fuel-cell stack—Study of oxidation intermediate products", Journal of Power Sources, 178, pp. 687-691, (2008).

Cooper, K.R. et al., "Electrical Test Methods for On-Line Fuel Cell Ohmic Resistance Measurement", Journal of Power Sources, vol. 160, pp. 1088-1095, (2006).

Niemann, J., "Unraveling Fuel Cell Electrical Measurements", Fuel Cell Magazine, Apr./May, pp. 26-31, (2005).

Smith, M. et al., "Comparison of Fuel Cell Electrolyte Resistance Measurement Techniques", Fuel Cell Magazine, Apr./May, pp. 32-37, (2005).

Hollinger et al., "Nanoporous separator and low fuel concentration to minimize crossover in direct methanol laminar flow fuel cells," Journal of Power of Sources, pp. 3523-3528, (2010).

Mench, et al., "Design of a Micro Direct Methanol Fuel Cell (μDMFC)," Proceedings of the IMECE, 8 pages (2001).

International Search Report dated Feb. 14, 2006 for PCT Appl. No. PCT/US2007/061980.

Primak et al., "Improved Performance of Direct Methanol Laminar Flow Fuel Cells," Proceedings 207$^{th}$ ECS Meeting, Abstract #137, Quebec City, Canada, May 15-20, (2005).

International Search Report dated Jun. 24, 2008 for PCT Appl. No. PCT/US2008/059146.

* cited by examiner

PERMSELECTIVE COMPOSITE MEMBRANE FOR ELECTROCHEMICAL CELLS

BACKGROUND

Fuel cell technology shows great promise as an alternative energy source for numerous applications. Several types of fuel cells have been constructed, including polymer electrolyte membrane fuel cells, direct methanol fuel cells, alkaline fuel cells, phosphoric acid fuel cells, molten carbonate fuel cells, and solid oxide fuel cells. For a comparison of several fuel cell technologies, see Los Alamos National Laboratory monograph LA-UR-99-3231 entitled Fuel Cells: Green Power by Sharon Thomas and Marcia Zalbowitz.

FIG. 1 represents an example of a fuel cell 100, including a high surface area anode 110 including an anode catalyst 112, a high surface area cathode 120 including a cathode catalyst 122, and an electrolyte 130 between the anode and the cathode. The electrolyte may be a liquid electrolyte; it may be a solid electrolyte, such as a polymer electrolyte membrane (PEM); or it may be a liquid electrolyte contained within a host material, such as the electrolyte in a phosphoric acid fuel cell (PAFC).

In operation of the fuel cell 100, fuel in the gas and/or liquid phase is brought over the anode 110 where it is oxidized at the anode catalyst 112 to produce protons and electrons in the case of hydrogen fuel, or protons, electrons, and carbon dioxide in the case of an organic fuel. The electrons flow through an external circuit 140 to the cathode 120 where air, oxygen, or an aqueous oxidant (e.g., peroxide) is being fed. Protons produced at the anode 110 travel through electrolyte 130 to cathode 120, where oxygen is reduced in the presence of protons and electrons at cathode catalyst 122, producing water in the liquid and/or vapor state, depending on the operating temperature and conditions of the fuel cell.

Hydrogen and methanol have emerged as important fuels for fuel cells, particularly in mobile power (low energy) and transportation applications. The electrochemical half reactions for a hydrogen fuel cell are listed below.

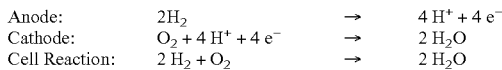

| Anode: | $2H_2$ | → | $4H^+ + 4e^-$ |
| Cathode: | $O_2 + 4H^+ + 4e^-$ | → | $2H_2O$ |
| Cell Reaction: | $2H_2 + O_2$ | → | $2H_2O$ |

To avoid storage and transportation of hydrogen gas, the hydrogen can be produced by reformation of conventional hydrocarbon fuels. In contrast, direct liquid fuel cells (DLFCs) utilize liquid fuel directly, and do not require a preliminary reformation step of the fuel. As an example, the electrochemical half reactions for a Direct Methanol Fuel Cell (DMFC) are listed below.

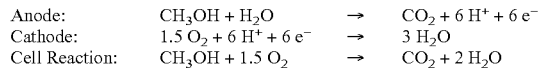

| Anode: | $CH_3OH + H_2O$ | → | $CO_2 + 6H^+ + 6e^-$ |
| Cathode: | $1.5 O_2 + 6H^+ + 6e^-$ | → | $3H_2O$ |
| Cell Reaction: | $CH_3OH + 1.5 O_2$ | → | $CO_2 + 2H_2O$ |

One challenge faced in developing DLFCs is the minimization of fuel "crossover." The material used to separate the liquid fuel feed from the gaseous oxidant feed in a DLFC typically is a stationary PEM that is not fully impermeable to fuels, such as methanol. As a result, fuel may cross over the membrane from the anode to the cathode, reacting with the cathode catalyst directly in the presence of oxygen to produce heat, water and carbon dioxide but no useable electric current. In addition to being a waste of fuel, crossover causes depolarization losses due to a mixed potential at the cathode and, in general, leads to decreased cell performance. Prior attempts to inhibit undesirable fuel crossover have met with mixed success. Measures that block migration of fuel to the cathode also typically hinder the flow of protons to the cathode, resulting in resistive losses in the fuel cell.

It is desirable to provide a system for minimizing fuel crossover in a fuel cell, while maintaining acceptable levels of proton transport to the cathode. Preferably, such a system also would provide one or more additional benefits, such as minimization of water accumulation at the cathode (referred to as "cathode flooding") or tunable fuel cell performance.

SUMMARY

In one aspect, the invention provides an electrochemical cell that includes an anode including an anode catalyst, a cathode including a cathode catalyst, and a first set of proton-conducting metal nanoparticles between the anode and the cathode. The first set of proton-conducting metal nanoparticles is not in contact with the anode.

In another aspect, the invention provides an electrochemical cell that includes an anode including an anode catalyst, a cathode assembly, and a channel between the anode and the cathode assembly. The cathode assembly includes a gas diffusion electrode, a cathode catalyst on the gas diffusion electrode, and proton-conducting metal nanoparticles on the cathode catalyst. The channel includes at least one inlet and at least one outlet.

In yet another aspect, the invention provides a cathode assembly for an electrochemical cell that includes a gas diffusion electrode, a cathode catalyst on the gas diffusion electrode, and proton-conducting metal nanoparticles on the cathode catalyst.

In yet another aspect, the invention provides a method of making a cathode assembly that includes placing proton-conducting metal nanoparticles on a cathode catalyst.

In yet another aspect, the invention provides a method of making an electrochemical cell that includes placing a first set of proton-conducting metal nanoparticles between an anode and a cathode.

In yet another aspect, the invention provides a method of making an electrochemical cell that includes placing a first set of proton-conducting metal nanoparticles on at least one of a cathode, a polymer electrolyte membrane, or a host material.

In yet another aspect, the invention provides a method of generating electricity from one of the above electrochemical cells that includes contacting the cathode with an oxidant, and contacting the anode with a fuel, where complementary half cell reactions take place at the cathode and the anode.

In yet another aspect, the invention provides a method of generating electricity from one of the above electrochemical cells that includes contacting the cathode with a flow of gaseous oxidant, flowing a liquid electrolyte through the channel, and contacting the anode with a fuel, where complementary half cell reactions take place at the cathode and the anode.

The following definitions are included to provide a clear and consistent understanding of the specification and claims.

The term "electrochemical cell" means a seat of electromotive force, as defined in *Fundamentals of Physics, Extended Third Edition* by David Halliday and Robert Resnick, John Wiley & Sons, New York, 1988, 662 ff. The term includes both galvanic (i.e., voltaic) cells and electrolytic cells, and subsumes the definitions of batteries, fuel cells, photocells (photovoltaic cells), thermopiles, electric generators, electrostatic generators, solar cells, and the like.

The term "complementary half-cell reactions" means oxidation and reduction reactions occurring in an electrochemical cell.

The term "proton-conducting metal nanoparticle" means a nanoparticle that includes at least one metal element and that can conduct hydrogen ions. Proton-conducting metal nanoparticles include nanoparticles including palladium (Pd), vanadium (V), niobium (Nb), tantalum (Ta), titanium (Ti), nickel (Ni) alloys, mixtures of these, and alloys of these with other metals. Examples of proton-conducting metal nanoparticles include nanoparticles that include palladium; alloys of palladium, such as alloys with silver (Pd—Ag) or copper (Pd—Cu); nickel alloys, such as alloys with vanadium (V—Ni) and titanium (V—Ni—Ti) and alloys with lanthanum ($La_5$—Ni); tantalum; niobium; vanadium; alloys of vanadium, such as alloys with nickel (V—Ni) and/or titanium (V—Ti and V—Ni—Ti) and alloys with chromium ($CrV_2$); titanium; and titanium alloys, such as V—Ti, V—Ni—Ti and alloys with iron (Ti—Fe).

The term "nanoparticle" means a particle with at least two dimensions of 100 nanometers (nm) or less. The term "nanoparticle" includes nanospheres; nanorods; nanofibers, including nanowires, nanobelts, and nanosheets; nanocards; and nanoprisms; and these nanoparticles may be part of a nanonetwork.

The term "nanosphere" means a nanoparticle having an aspect ratio of at most 3:1.

The term "aspect ratio" means the ratio of the longest axis of an object to the shortest axis of the object, where the axes are not necessarily perpendicular.

The term "longest dimension" of a nanoparticle means the longest direct path of the nanoparticle. The term "direct path" means the shortest path contained within the nanoparticle between two points on the surface of the nanoparticle. For example, a helical nanoparticle would have a longest dimension corresponding to the length of the helix if it were stretched out into a straight line.

The term "nanorod" means a nanoparticle having a longest dimension of at most 200 nm, and having an aspect ratio of from 3:1 to 20:1.

The term "nanofiber" means a nanoparticle having a longest dimension greater than 200 nm, and having an aspect ratio greater than 20:1.

The term "nanowire" means a nanofiber having a longest dimension greater than 1,000 nm.

The term "nanobelt" means a nanofiber having a cross-section in which the ratio of the width to the height of the cross-section is at least 2:1.

The term "width" of a cross-section is the longest dimension of the cross-section, and the "height" of a cross-section is the dimension perpendicular to the width.

The term "nanosheet" means a nanobelt in which the ratio of the width of the cross-section to the height of the cross-section is at least 20:1.

The term "nanocard" means a nanoparticle having a cross-section in which the ratio of the width of the cross-section to the height of the cross-section is at least 2:1, and having a longest dimension less than 100 nm.

The term "nanoprism" means a nanoparticle having at least two non-parallel faces connected by a common edge.

The term "nanonetwork" means a plurality of individual nanoparticles that are interconnected.

The "length" of a nanoparticle means the longest dimension of the nanoparticle.

The "width" of a nanoparticle means the average of the widths of the nanoparticle; and the "diameter" of a nanoparticle means the average of the diameters of the nanoparticle.

The "average" dimension of a plurality of nanoparticles means the average of that dimension for the plurality. For example, the "average diameter" of a plurality of nanospheres means the average of the diameters of the nanospheres, where a diameter of a single nanosphere is the average of the diameters of that nanosphere.

The term "on", in the context of components of an electrochemical cell or a cathode assembly, means supported by. A first component that is on a second component may be separated from the second component by one or more other components. The first component may or may not be above the second component during the making or operation of the cell or the assembly.

The term "active area" of an electrochemical cell or a cathode assembly means the geometric area of the cathode at which a half-cell reaction can occur. The geometric area (length times width) is not necessarily equal to the microscopic surface area. For example, a fuel cell having a PEM sandwiched between two electrodes has an active area equal to the length of the cathode times the width of the cathode. In another example, a fuel cell having a channel for a liquid electrolyte between two electrodes has an active area that is the total area of the portion(s) of the cathode exposed to the channel.

The term "blocking layer" means a liquid-tight layer in which a concentration gradient can be maintained between two liquids of differing concentration on either side of the layer. A blocking layer may permit a net flow of liquid molecules to pass between the two liquids, but prevents mixing of the bulk of the two liquids.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

The present invention makes use of the discovery that incorporation of proton-conducting metal nanoparticles between the cathode and the anode of an electrochemical cell may provide for a decrease in fuel crossover to the cathode, while maintaining acceptable levels of proton conduction. At least a portion of the proton-conducting metal nanoparticles are not in contact with the anode. The proton-conducting metal nanoparticles may be present in a mixture with a matrix material, and the properties of the electrochemical cell may be adjusted by changing the type of matrix material and/or the ratio of nanoparticles to the matrix material.

A method of making an electrochemical cell may include placing proton-conducting metal nanoparticles between an anode and a cathode, such that at least a portion of the proton-conducting metal nanoparticles are not in contact with the anode. The portion of the proton-conducting metal nanoparticles that are not in contact with the anode may be applied to the cathode, and/or they may be applied to a polymer electrolyte membrane or a host material containing a liquid electrolyte. Proton-conducting metal nanoparticles may be applied as an ink with a solvent and/or a matrix precursor. Heat and/or pressure may be applied once the proton-conducting metal nanoparticles have been applied.

Figure 1:
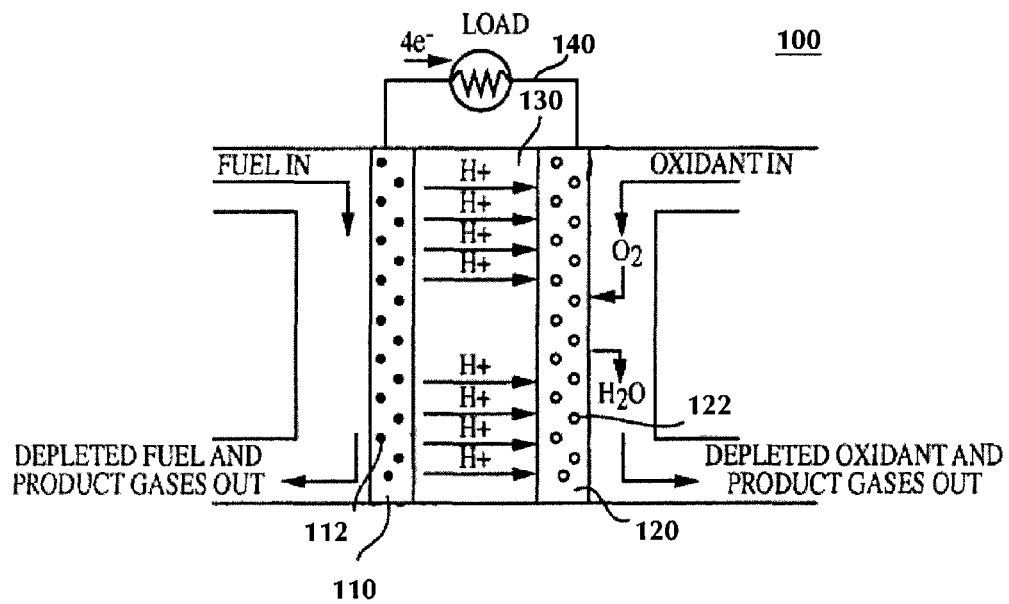
FIG. 1 is a schematic representation of a fuel cell.
Figure 2:
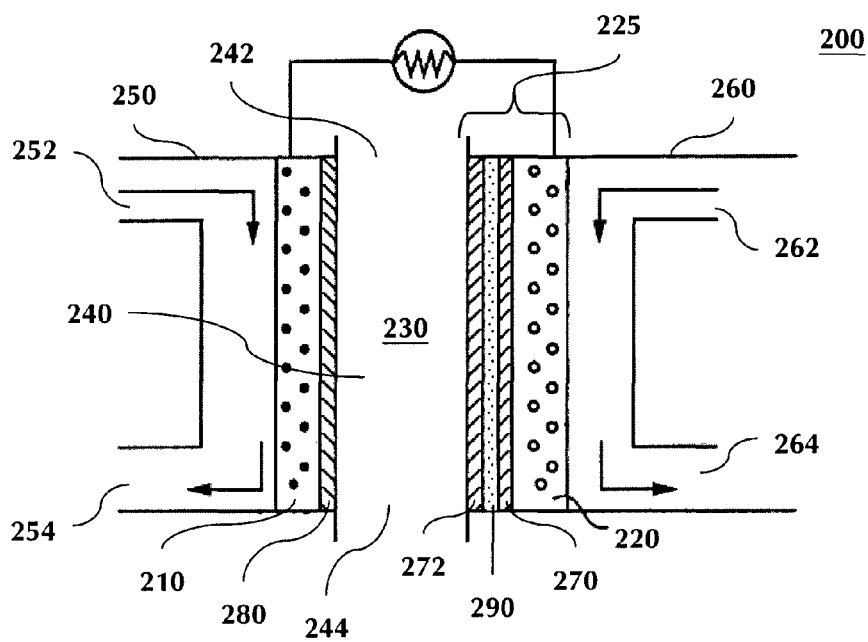
FIG. 2 is a schematic representation of a liquid electrolyte electrochemical cell including proton-conducting metal nanoparticles between the anode and cathode.

FIG. 2 represents an example of an electrochemical cell 200 that includes an anode 210, a cathode 220, proton-conducting metal nanoparticles 290, and a channel 240 between the anode and the proton-conducting metal nanoparticles. The channel 240 includes an inlet 242 and an outlet 244, and may include a liquid electrolyte 230 during operation of the electrochemical cell. The anode 210 has first and second surfaces. The first surface is in contact with the channel 240, and optional blocking layer 280 may be present at the first surface. The second surface of anode 210 may be in contact with optional fuel channel 250, including a fuel inlet 252 and a fuel outlet 254. The fuel for reaction at the anode may be in the liquid electrolyte 230, in the optional fuel channel 250, or in both. The cathode 220 has first and second surfaces, and the first surface may be in contact with optional oxidant channel 260, including an oxidant inlet 262 and optional oxidant outlet 264. The second surface of cathode 220 is in contact with the proton-conducting metal nanoparticles 290, and optional blocking layer 270 may be present at the second surface. An optional blocking layer 272 may be present between the proton-conducting metal nanoparticles 290 and the channel 240. The cathode 220, the proton-conducting metal nanoparticles 290 and any optional blocking layers 270 and/or 272 together are a cathode assembly 225.

The anode 210 includes an anode catalyst that typically is platinum or a combination of platinum with another metal. Examples of bimetallic anode catalysts include combinations of platinum with ruthenium, tin, osmium or nickel. The anode may include a porous conductor, such as a gas diffusion electrode (GDE). The first surface of the anode optionally may include blocking layer 280 to protect the electroactive area of the anode from direct bulk contact with the liquid electrolyte 230.

In an example of electrochemical cell 200, the anode 210 is in contact with fuel channel 250. In this example, a fuel composition flows through the channel from fuel inlet 252 to fuel outlet 254, contacting the catalyst so that a complementary half cell reaction may take place at the anode. The half cell reaction at the anode in a fuel cell typically produces protons and electrons. The fuel composition may contain a fuel such as hydrogen or an oxidizable organic compound. In another example of electrochemical cell 200, fuel channel 250 is not present, the fuel instead being in the liquid electrolyte 230. In this example, the fuel in the liquid electrolyte contacts the catalyst of the anode to form protons and electrons. The fuel may contain an oxidizable organic molecule. One potential complication of this example is that there is an increased risk of fuel crossover to the cathode 220, relative to an electrochemical cell having the anode positioned between the fuel composition and the cathode.

Oxidizable organic molecules that may be used as fuels in a fuel cell include organic molecules having only one carbon atom. Oxidizable organic molecules that may be used as fuels in a fuel cell include organic molecules having two or more carbons but not having adjacent alkyl groups, and where all carbons are either part of a methyl group or are partially oxidized. Examples of such oxidizable organic molecules include methanol, formaldehyde, formic acid, glycerol, ethanol, isopropyl alcohol, ethylene glycol and formic and oxalic esters thereof, oxalic acid, glyoxylic acid and methyl esters thereof, glyoxylic aldehyde, methyl formate, dimethyl oxalate, and mixtures thereof. Preferred fuels include gaseous hydrogen, gaseous pure methanol, liquid pure methanol and aqueous mixtures of methanol, including mixtures of methanol and an electrolyte.

The cathode 220 includes a cathode catalyst, so that a complementary half cell reaction may take place at the cathode. The half cell reaction at the cathode in a fuel cell is typically a reaction between a gaseous oxidant and ions from the electrolyte, such as $H^+$ ions. Examples of cathode catalysts include platinum and combinations of platinum with another metal, such as cobalt, nickel or iron. The cathode may also include a porous conductor, such as a GDE. In one example, the GDE may include a porous carbon substrate, such as teflonized (0-50%) carbon paper of 50-250 micrometer (micron) thickness. A specific example of this type of GDE is Sigracet® GDL 24 BC, available from SGL Carbon AG (Wiesbaden, Germany).

In an example of electrochemical cell 200, the cathode 220 is in contact with oxidant channel 260. In this example, the oxidant supplied to the cathode may be a stream of air or gaseous oxygen. For an oxidant channel 260 having an oxidant outlet 264, maintaining an adequate pressure at the outlet may provide for essentially one-way diffusion of oxidant through the GDE of cathode 220. When pure oxygen is used as the gaseous oxidant, no depleted oxidant is formed. Thus, an oxidant outlet may be unnecessary, and the oxidant channel 260 may be closed off or may terminate near the end of cathode 220. In another example of electrochemical cell 200, oxidant channel 260 is not present, the oxidant instead being in the liquid electrolyte 230.

The liquid electrolyte 230 may be any aqueous mixture of ions. Preferably the liquid electrolyte includes a protic acid. Examples of protic acids include hydrochloric acid (HCl), chloric acid ($HClO_3$), perchloric acid ($HClO_4$), hydroiodic acid (HI), hydrobromic acid (HBr), nitric acid ($HNO_3$), nitrous acid ($HNO_2$), phosphoric acid ($H_3PO_4$), sulfuric acid ($H_2SO_4$), sulfurous acid ($H_2SO_3$), trifluoromethanesulfonic acid (triflic acid, $CF_3SO_3H$) and combinations. More preferably the liquid electrolyte includes sulfuric acid. The liquid electrolyte may also contain non-acidic salts, such as halide, nitrate, sulfate, or triflate salts of alkali metals and alkaline earth metals or combinations.

In one example, the liquid electrolyte 230 may include sulfuric acid at a concentration of at least 0.1 moles/Liter (M). Preferably the liquid electrolyte includes sulfuric acid at a concentration of at least 0.2 M, more preferably at least 0.3 M, more preferably at least 0.4 M, more preferably at least 0.5 M, more preferably at least 1.0 M, and more preferably at least 1.5 M. Preferably the liquid electrolyte includes sulfuric acid at a concentration of from 0.1 to 9.0 M, more preferably from 0.5 to 7.0 M, more preferably from 0.75 M to 5.0 M, and more preferably from 1.0 to 3.0 M.

In one example, the liquid electrolyte 230 may be transported in the channel 240 at a rate of at least 10 cm/min. Preferably the liquid electrolyte is transported in the channel at a rate of at least 50 cm/min, and more preferably at least 100 cm/min. Preferably the liquid electrolyte is transported in the channel at a rate of from 10 to 1000 cm/min, more preferably from 50 to 500 cm/min, and more preferably from 100 to 300 cm/min.

The channel 240 includes at least one inlet 242 and at least one outlet 244. A channel having a single inlet 242 may be useful for electrochemical cells in which the fuel and/or the oxidant are supplied to the appropriate electrode at the side of the electrode opposite the channel. For example, if the fuel is supplied to the anode through optional fuel channel 250, the oxidant may be supplied to the cathode through channel 240 or through optional oxidant channel 260. In another example, if the oxidant is supplied to the cathode through optional oxidant channel 260, the fuel may be supplied to the anode through channel 240 or through optional fuel channel 250. A channel having a single channel 242 may have a single outlet 244, or it may have more than one outlet, which may facilitate separation of reaction products from the electrolyte stream.

The channel 240 may include two or more inlets and two or more outlets. For example, the channel 240 may include a first and second inlets, and first and second outlets. During operation of such an electrochemical cell, the liquid electrolyte 230 may include two electrolyte streams that flow though the channel 240. In this example, a first stream flows between the first inlet and the first outlet and is in contact with the anode 210, and a second stream flows between the second inlet and the second outlet and is in contact with the cathode assembly 225. The first stream may include a fuel, and the second stream may include an oxidant, or the fuel and/or oxidant may be supplied through optional channels 250 or 260, respectively. The compositions of the two streams may be the same, or they may be different. For example, the first stream may include a fuel in an electrolyte, the second stream may include an electrolyte without a fuel, and the electrolyte portions of each stream may be the same or they may be different. Each stream independently may be recirculated and/or treated to remove reaction products.

For an electrochemical cell having a channel 240 having two inlets and two outlets, the electrolyte streams may flow through the channel 240 by laminar flow. A laminar flow fuel cell (LFFC) uses the laminar flow properties of liquid streams to limit the mixing or crossover between two streams and to create a dynamic conducting interface, which may replace the stationary PEM or salt bridge of conventional electrochemical cells. This interface is referred to as an "induced dynamic conducting interface" (IDCI). The IDCI can maintain concentration gradients over considerable flow distances and residence times, depending on the dissolved species and the dimensions of the flow channel. The IDCI preferably conducts protons, completing the electric circuit while keeping the streams from convectively mixing and keeping the fuel from contacting the cathode. The relative flow rates of the streams can be adjusted to locate the laminar flow boundary at various positions between the anode and the cathode assembly. LFFC systems are described, for example, in U.S. Pat. No. 6,713,206 to Markoski et al., which is incorporated by reference.

One possible disadvantage of LFFCs is the need to keep the cells physically stable. Tilting or jolting of an LFFC may flip or twist the liquid streams, causing the fuel and oxidant to come in contact with the wrong electrode and leading to crossover, catastrophic failure, and/or cell reversal until the stable fluid flow can be restored. This disadvantage may be reduced or eliminated with the presence of a porous separator between the streams, as described in U.S. patent application Ser. No. 11/228,453, filed Sep. 15, 2005, entitled "Electrochemical Cells", with inventors Larry J. Markoski, Dilip Natarajan and Alex Primak, which is incorporated by reference. Preferably the porous separator is sufficiently hydrophilic as to provide for fluid within the streams to be drawn into the pores by capillary action, and/or for gas within the pores to be displaced by the fluid. The two streams of fluid on either side of the separator are thus in direct contact, allowing ion transport between the two streams.

The proton-conducting metal nanoparticles 290 are nanoparticles that include at least one metal and that can conduct hydrogen ions. Examples of proton-conducting metals that may be present in the nanoparticles include, for example, palladium (Pd), vanadium (V), niobium (Nb), tantalum (Ta), titanium (Ti), nickel (Ni) alloys, mixtures of these, and alloys of these with other metals. Examples of proton-conducting metals include palladium; alloys of palladium, such as alloys with silver (Pd—Ag) or copper (Pd—Cu); nickel alloys, such as alloys with vanadium (V—Ni) and titanium (V—Ni—Ti) and alloys with lanthanum ($La_5$—Ni); tantalum; niobium; vanadium; alloys of vanadium, such as alloys with nickel (V—Ni) and/or titanium (V—Ti and V—Ni—Ti) and alloys with chromium ($CrV_2$); titanium; and titanium alloys, such as V—Ti, V—Ni—Ti and alloys with iron (Ti—Fe). Preferably the nanoparticles include palladium.

Preferably the proton-conducting metal nanoparticles 290 include palladium nanoparticles. Palladium nanoparticles may be pure palladium or a palladium alloy, and optionally may contain inert substances, such as supporting materials. Preferably at least 90 weight percent (wt %) of the transition metal content of the palladium nanoparticles is palladium. More preferably the concentration of non-palladium transition metals in the palladium nanoparticles is at most 10,000 parts per million (ppm). More preferably the concentration of non-palladium transition metals in the palladium nanoparticles is at most 7,500 ppm, more preferably at most 5,000 ppm, more preferably at most 2,500 ppm, more preferably at most 1,000 ppm, and more preferably at most 500 ppm.

The proton-conducting metal nanoparticles 290 preferably permit rapid diffusion of hydrogen through the bulk of the nanoparticle. One possible explanation for this phenomenon is that protons can chemisorb onto the surface of a proton-conducting metal nanoparticle and can then bond together to form hydrogen. This results in an ejection of protons from another portion of the surface to maintain the nanoparticle in a neutral state. See, for example, U.S. Patent Application Publication US 2002/0031695 A1 at paragraphs 0072 and 0087-0088; and U.S. Pat. No. 6,641,948 B1 at column 18, line 25-column 19, line 46.

The proton-conducting metal nanoparticles 290 are particles with at least two dimensions of 100 nm or less. The nanoparticles may be in the form of nanospheres, nanorods, nanofibers, nanocards, nanoprisms, or mixtures of these. Proton-conducting nanofibers may further be in the form of nanowires, nanobelts, nanosheets, or mixtures of these. In addition, the nanoparticles may be interconnected as a nanonetwork.

Preferably the proton-conducting metal nanoparticles 290 include nanospheres, having an average aspect ratio of at most 3:1. Preferably the proton-conducting metal nanoparticles include nanospheres having an average diameter of at most 50 nm. More preferably the proton-conducting metal nanoparticles include nanospheres having an average diameter of at most 25 nm, more preferably of at most 15 nm, more preferably of at most 10 nm, and more preferably of at most 6 nm. Preferably the proton-conducting metal nanoparticles have a surface area of at least 0.1 square meters per gram ($m^2/g$). More preferably the proton-conducting metal nanoparticles have a surface area of at least 23 $m^2/g$, more preferably of at least 40 $m^2/g$, and more preferably of at least 60 $m^2/g$.

The proton-conducting metal nanoparticles 290 may be present in a layer on the cathode 220 without any other substance, or the nanoparticles may be present in a mixture with a matrix material and/or with the cathode catalyst. Examples of matrix materials include inorganic networks, such as porous ceramics and zeolites; organic networks, such as carbon tubes and crosslinked gels; membranes, such as microfiltration membranes, ultrafiltration membranes, nanofiltration membranes and ion-exchange membranes; and combinations of inorganic networks, organic networks and/or membranes, such as inorganic/organic composites. Preferably the proton-conducting metal nanoparticles 290 are present on the cathode catalyst, with or without a blocking layer between the nanoparticles and the cathode catalyst.

In one example, the proton-conducting metal nanoparticles 290 are present as a mixture with a membrane material, such as a permeable polymeric material that restricts the permeation of at least one chemical substance. See, for example, Baker, R. W. "Membrane Technology," *Encyclopedia of Polymer Science and Technology*, Vol. 3, pp. 184-248 (2005). For example, the proton-conducting metal nanoparticles may be mixed with an inert polymer or a functionalized polymer, such as a polymer that is typically used as a membrane between the electrodes of a fuel cell. These fuel cell membranes include polymer electrolyte membranes (PEM), which may be cation-exchange membranes or anion-exchange membranes. Examples of PEMs that may be used as a matrix material include polymers and copolymers derived at least in part from perfluorosulfonic acid, such as Nafion® (DuPont; Wilmington, Del.), Aciplex® Si 004 (Asahi Chemical Industry Company; Tokyo, Japan), XUS-13204 (Dow Chemical Company; Midland, Mich.), and GORE-SELECT® (W. L. Gore; Elkton, Md.). These fuel cell membranes also include non-ionic membranes or separators, such as expanded poly(tetrafluoroethylene) (i.e. GORE-TEX®, W. L. Gore); expanded polyethylene; membranes of aromatic polymers such as polyphenylene oxide (PPO), polyphenylene sulfide, polyphenylene sulfone (PPS), poly(etheretherketone) (PEEK), polybenzimidazole (PBI), polybenzazoles, polybenzothiazoles, polyimides, and fluorinated polystyrene; and membranes of inorganic-organic polymers, such as polyphosphazenes and poly(phenylsiloxanes). Non-ionic membranes or composite membranes typically serve as a host material to hold the electrolyte between the two electrodes, and may be doped with a liquid or solid acid electrolyte to become proton conducting. These non-ionic membranes may be functionalized with acid groups or ammonium groups to form cation-exchange membranes or anion-exchange membranes.

For proton-conducting metal nanoparticles 290 that are present as a mixture with a matrix material, the mixture may contain from 1 to 99 wt % proton-conducting metal nanoparticles. Preferably the mixture contains from 10 to 95 wt % proton-conducting metal nanoparticles. More preferably the mixture contains from 25 to 90 wt % proton-conducting metal nanoparticles, and more preferably from 50 to 85 wt % proton-conducting metal nanoparticles.

Preferably the proton-conducting metal nanoparticles 290 are present at a level of at least 0.1 milligram per square centimeter ($mg/cm^2$) of the active area of the cathode 220. The active area means the geometric area of the cathode at which a half-cell reaction can occur. More preferably the proton-conducting metal nanoparticles are present at a level of at least 1 $mg/cm^2$, more preferably of at least 1.5 $mg/cm^2$, and more preferably of at least 2 $mg/cm^2$ of the active area of the cathode. Preferably the proton-conducting metal nanoparticles are present at a level of from 0.1 to 10 $mg/cm^2$, more preferably from 1 to 7 $mg/cm^2$, and more preferably from 2 to 5 $mg/cm^2$ of the active area of the cathode. Preferably the proton-conducting metal nanoparticles are confined within a region having a thickness of from 0.1 to 10 microns. More preferably the proton-conducting metal nanoparticles are confined within a region having a thickness of from 0.5 to 10 microns, more preferably from 0.7 to 7 microns, and more preferably from 1 to 5 microns.

Proton-conducting metal nanoparticles may be present in more than one location within an electrochemical cell. For example, palladium may be combined with platinum as an anode catalyst for fuel cells that use formic acid as a fuel. See, for example, U.S. Patent Application Publication No. 2003/0198852 A1 to Masel et al. Thus, the proton-conducting metal nanoparticles 290 may be referred to as a "first set" of proton-conducting metal nanoparticles. This description does not imply that proton-conducting metal nanoparticles are present in more than one location.

Optional blocking layers 270, 272 and 280 may be any material that protects the electroactive area of an electrode or the proton-conducting metal nanoparticles from direct bulk contact with the liquid electrolyte. A blocking layer preferably allows for the conduction or permeation of ions to and/or from the catalyst, without allowing significant liquid breakthrough or hydraulic flooding of liquid electrolyte into the electrode or the gas flow stream channels. Examples of blocking layer materials include inorganic networks, organic networks, membranes, and combinations of inorganic networks, organic networks and/or membranes, as described above. Preferred materials for the optional blocking layers include fuel cell membranes such as PEMs, non-ionic membranes, and composite membranes. Preferably a blocking layer has a total thickness of 50 microns or less. If a blocking layer on an electrode is too thick to maintain proton transport rates, the electrode can suffer resistive losses that inhibit performance of the electrochemical cell.

In one example, optional blocking layers 270 or 280 at an electrode surface independently may include a film or porous layer onto which is bonded a catalyst, such as 4 $mg/cm^2$ Pt black. Unlike the membrane between the anode and cathode of a typical PEM fuel cell, which can have catalyst on both sides of the membrane, this blocking layer has catalyst on only one side of the layer. In another example, the anode 210 or cathode 220 independently may include a GDE and a catalyst, where the catalyst forms a liquid-tight layer at the surface of the GDE. Such a liquid-tight catalyst layer may serve as blocking layer 270 or 280.

A method of making electrochemical cell 200 may include combining an anode 210 and a cathode assembly 225 such that a channel 240 is present between the anode and the cathode assembly. A method of making a cathode assembly 225 may include depositing proton-conducting metal nanoparticles on a cathode 220. The depositing proton-conducting metal nanoparticles may include forming an ink containing the proton-conducting metal nanoparticles. In one example, the ink may be applied directly to the cathode. In another example, the ink may be applied to a blocking layer 270 at the cathode surface. For either of these examples, a blocking layer 272 optionally may be formed on the nanoparticles. In another example, the ink may be applied to a blocking layer 272, and then contacted directly with a cathode 220 or contacted with a blocking layer 270 at the cathode surface. Once the ink has been deposited on the cathode, the cathode and the nanoparticles may be subjected to heat and/or pressure. This hot pressing may be performed on a partial cathode assembly, or it may be performed on a complete cathode assembly.

A method of forming an ink containing proton-conducting metal nanoparticles may include combining ingredients, where the ingredients contain proton-conducting metal nanoparticles and a solvent. The solvent may be water, one or more organic solvents, or a mixture of water with one or more organic solvents. In this method, the ink to be deposited on the cathode includes proton-conducting metal nanoparticles and a solvent. This method may be used to provide a layer of proton-conducting metal nanoparticles without a matrix material in the cathode assembly 225.

A method of forming an ink containing proton-conducting metal nanoparticles may include combining ingredients, where the ingredients contain proton-conducting metal nanoparticles and a matrix precursor. The ingredients may also contain a solvent, such as water, one or more organic solvents, or a mixture of water with one or more organic solvents. A matrix precursor is a composition that will form a matrix when it is solidified. A matrix precursor may include one or more monomers and/or prepolymers that can react to form a polymer matrix, an inorganic matrix, or a composite matrix. A matrix precursor may include a polymer that is dissolved or dispersed in the solvent, and that can form a polymer matrix when the solvent is at least partially removed. A matrix precursor may include a polymer at a temperature above its melt temperature, and which can form a polymer matrix when cooled to a temperature below its melt temperature. In this method, the ink to be deposited on the cathode includes proton-conducting metal nanoparticles and a matrix precursor. This method may be used to provide a layer of proton-conducting metal nanoparticles mixed with a matrix material in the cathode assembly 225.

Preferably the ink includes proton-conducting metal nanoparticles, a precursor for a polymeric membrane, and a solvent. Such mixtures may contain the proton-conducting metal nanoparticles and the membrane precursor in a weight ratio of from 1:100 to 100:1. Preferably the ink contains the proton-conducting metal nanoparticles and the membrane precursor in a weight ratio of from 1:10 to 20:1, more preferably from 1:4 to 10:1, and more preferably from 1:1 to 5:1.

A method of generating electricity from electrochemical cell 200 may include contacting cathode 220 with an oxidant, and contacting anode 210 with a fuel, where complementary half cell reactions take place at the cathode and the anode. Contacting the cathode with an oxidant may include flowing an oxidant, or a composition including an oxidant, through the optional oxidant channel 260. Contacting the cathode with an oxidant may include flowing an electrolyte 230 through channel 240, where the electrolyte includes an oxidant. Contacting the anode with a fuel may include flowing a fuel, or a composition including a fuel, through the optional fuel channel 250. Contacting the anode with a fuel may include flowing an electrolyte 230 through channel 240, where the electrolyte includes a fuel.

Figure 3:
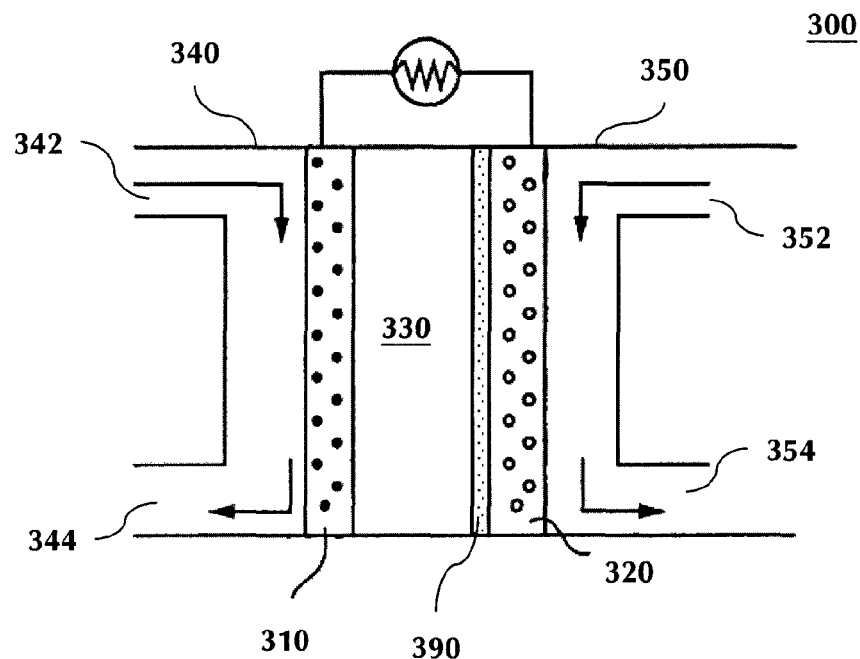
FIG. 3 is a schematic representation of a membrane electrode assembly (MEA) electrochemical cell including proton-conducting metal nanoparticles between the anode and cathode.

FIG. 3 represents an example of an electrochemical cell 300 that includes an anode 310, a cathode 320, proton-conducting metal nanoparticles 390, and an electrolyte 330 between the anode and the proton-conducting metal nanoparticles. The anode 310 has first and second surfaces, and the first surface is in contact with the electrolyte 330. The second surface of anode 310 is in contact with a fuel channel 340, including a fuel inlet 342 and a fuel outlet 344. The cathode 320 includes a GDE, and has first and second surfaces. The first surface of cathode 320 is in contact with an oxidant channel 350, including an oxidant inlet 352 and optional oxidant outlet 354, and the second surface of cathode 320 is in contact with the proton-conducting metal nanoparticles 390. The anode, cathode, fuel, and proton-conducting metal nanoparticles may be as described above for electrochemical cell 200. The electrolyte 330 may be a PEM, or it may be a liquid electrolyte within a host material. Examples of host materials that can contain a liquid electrolyte include inorganic networks, non-ionic membranes, and inorganic/organic composites.

The proton-conducting metal nanoparticles 390 may be present in a discrete layer between the cathode 320 and the electrolyte 330. The proton-conducting metal nanoparticles may be present in a layer without any other substance, or the nanoparticles may be present in a mixture, as described above for electrochemical cell 200. The nanoparticles may be present in a mixture with a matrix material. The composition of the matrix material may be the same as or different from the composition of the PEM or the host material present in the electrolyte 330. Preferably the proton-conducting metal nanoparticles 390 are present on the cathode catalyst, with or without a blocking layer between the nanoparticles and the cathode catalyst.

The proton-conducting metal nanoparticles 390 may be present as a mixture with the PEM or host material of the electrolyte 330 at the interface of the electrolyte and the cathode 320. For example, the proton-conducting metal nanoparticles may be present as a mixture with a material having the same composition as the PEM or host material, and the material forming the matrix for the nanoparticles may be integral with the PEM or host material. The proton-conducting metal nanoparticles may be present in a concentration gradient in a PEM, and the maximum concentration of nanoparticles may be at the interface between the PEM and the cathode, or it may be in the interior of the PEM.

For proton-conducting metal nanoparticles 390 that are present as a mixture, either with the PEM or host material at the electrolyte-cathode interface or with a matrix material, the mixture may contain from 1 to 99 wt % proton-conducting metal nanoparticles. Preferably the mixture contains from 10 to 95 wt % proton-conducting metal nanoparticles, more preferably from 25 to 90 wt % proton-conducting metal nanoparticles, and more preferably from 50 to 85 wt % proton-conducting metal nanoparticles. The proton-conducting metal nanoparticles may be present at a level of at least 0.1 mg/cm$^2$ of the active area of the cathode 320. Preferably the proton-conducting metal nanoparticles may be present at a level of at least 1 mg/cm², more preferably of at least 1.5 mg/cm², and more preferably of at least 2 mg/cm² of the active area of the cathode. Preferably the proton-conducting metal nanoparticles are confined within a region having a thickness of from 0.1 to 10 microns, more preferably of from 0.5 to 10 microns, more preferably of from 0.7 to 7 microns, and more preferably from 1 to 5 microns.

A method of making electrochemical cell 300 may include placing proton-conducting metal nanoparticles between a cathode 320 and an electrolyte 330. The proton-conducting metal nanoparticles may be deposited on the cathode and/or on the PEM or host material of the electrolyte. The depositing proton-conducting metal nanoparticles may include forming an ink containing the proton-conducting metal nanoparticles, as described above for electrochemical cell 200. In one example, the ink may be applied directly to the cathode 320, and then contacted with the electrolyte 330. In another example, the ink may be applied to the PEM or host material of the electrolyte 330, and then contacted with the cathode 320. For each of these examples, the anode already may be in contact with the electrolyte, or the anode and electrolyte may be brought into contact after the nanoparticles have been placed between the cathode and the electrolyte. Once the ink has been deposited, the nanoparticles may be subjected to heat and/or pressure. This hot pressing may be performed on a partially assembled electrode, on a fully assembled single electrode, or on a pair of fully assembled electrodes.

A method of generating electricity from electrochemical cell 300 may include contacting cathode 320 with an oxidant, and contacting anode 310 with a fuel, where complementary half cell reactions take place at the cathode and the anode. Contacting the cathode with an oxidant may include flowing an oxidant, or a composition including an oxidant, through the oxidant channel 350. Contacting the anode with a fuel may include flowing a fuel, or a composition including a fuel, through the fuel channel 340.

Figure 4:
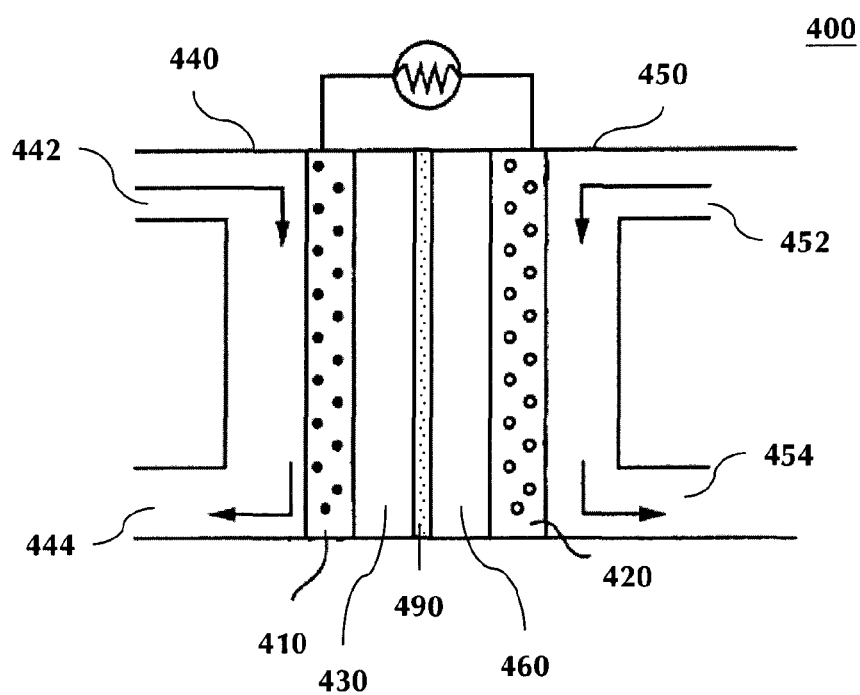
FIG. 4 is a schematic representation of an MEA electrochemical cell including proton-conducting metal nanoparticles between the anode and cathode.

FIG. 4 represents an example of an electrochemical cell 400 that includes an anode 410, a cathode 420, proton-conducting metal nanoparticles 490, a first electrolyte 430 between the anode and the proton-conducting metal nanoparticles, and a second electrolyte 460 between the proton-conducting metal nanoparticles and the cathode. The anode 410 has first and second surfaces, and the first surface is in contact with the first electrolyte 430. The second surface of anode 410 is in contact with a fuel channel 440, including a fuel inlet 442 and a fuel outlet 444. The cathode 420 includes a GDE, and has first and second surfaces. The first surface of cathode 420 is in contact with an oxidant channel 450, including an oxidant inlet 452 and optional oxidant outlet 454, and the second surface of cathode 420 is in contact with the second electrolyte 460. The anode, cathode, fuel, and proton-conducting metal nanoparticles may be as described above for electrochemical cell 200.

The first and second electrolytes 430 and 460 may have the same composition, or they may have different compositions. Each electrolyte independently may be a PEM, or it may be a liquid electrolyte within a host material. Examples of host materials that can contain a liquid electrolyte include inorganic networks, non-ionic membranes, and inorganic/organic composites.

The proton-conducting metal nanoparticles 490 may be present in a discrete layer between the first and second electrolytes 430 and 460. The proton-conducting metal nanoparticles may be present in a layer without any other substance, or the nanoparticles may be present in a mixture with a matrix material. The composition of the matrix material may be the same as or different from the composition of the PEM or the host material present in either of the first or second electrolytes.

The proton-conducting metal nanoparticles 490 may be present as a mixture with the PEM or host material of the first electrolyte 430 and/or with the PEM or host material of the second electrolyte 460 at the interface between the two electrolytes. For example, the proton-conducting metal nanoparticles may be present as a mixture with a material having the same composition as the PEM or host material of one or both electrolytes, and the material forming the matrix for the nanoparticles may be integral with the PEM or host material of one or both electrolytes. The proton-conducting metal nanoparticles may be present in a discrete region having a uniform concentration of nanoparticles, or the nanoparticles may be present in a concentration gradient.

For proton-conducting metal nanoparticles 490 that are present as a mixture, either with the PEM or host material at the electrolyte-electrolyte interface or with a matrix material, the mixture may contain from 1 to 99 wt % proton-conducting metal nanoparticles. Preferably the mixture contains from 10 to 95 wt % proton-conducting metal nanoparticles, more preferably from 25 to 90 wt % proton-conducting metal nanoparticles, and more preferably from 50 to 85 wt % proton-conducting metal nanoparticles. The proton-conducting metal nanoparticles may be present at a level of at least 0.1 mg/cm² of the active area of the cathode 420. Preferably the proton-conducting metal nanoparticles may be present at a level of at least 1 mg/cm², more preferably of at least 1.5 mg/cm², and more preferably of at least 2 mg/cm² of the active area of the cathode. Preferably the proton-conducting metal nanoparticles are confined within a region having a thickness of from 0.1 to 10 microns, more preferably of from 0.5 to 10 microns, more preferably of from 0.7 to 7 microns, and more preferably from 1 to 5 microns.

A method of making electrochemical cell 400 may include placing proton-conducting metal nanoparticles between a first electrolyte 430 and a second electrolyte 460. The proton-conducting metal nanoparticles may be deposited on the PEM or host material of one or both of the electrolytes. The depositing proton-conducting metal nanoparticles may include forming an ink containing the proton-conducting metal nanoparticles, as described above for electrochemical cell 200. The anode and cathode independently may be in contact with the first and second electrolytes, respectively, prior to the deposition of the nanoparticles. The anode and cathode independently may be brought into contact with the electrolytes after the nanoparticles have been placed between the PEM's or host materials of the electrolytes. Once the ink has been deposited, the nanoparticles may be subjected to heat and/or pressure. This hot pressing may be performed on a partially assembled electrode, on a fully assembled single electrode, or on a pair of fully assembled electrodes.

A method of generating electricity from electrochemical cell 400 may include contacting cathode 420 with an oxidant, and contacting anode 410 with a fuel, where complementary half cell reactions take place at the cathode and the anode. Contacting the cathode with an oxidant may include flowing an oxidant, or a composition including an oxidant, through the oxidant channel 450. Contacting the anode with a fuel may include flowing a fuel, or a composition including a fuel, through the fuel channel 440.

Figure 5:
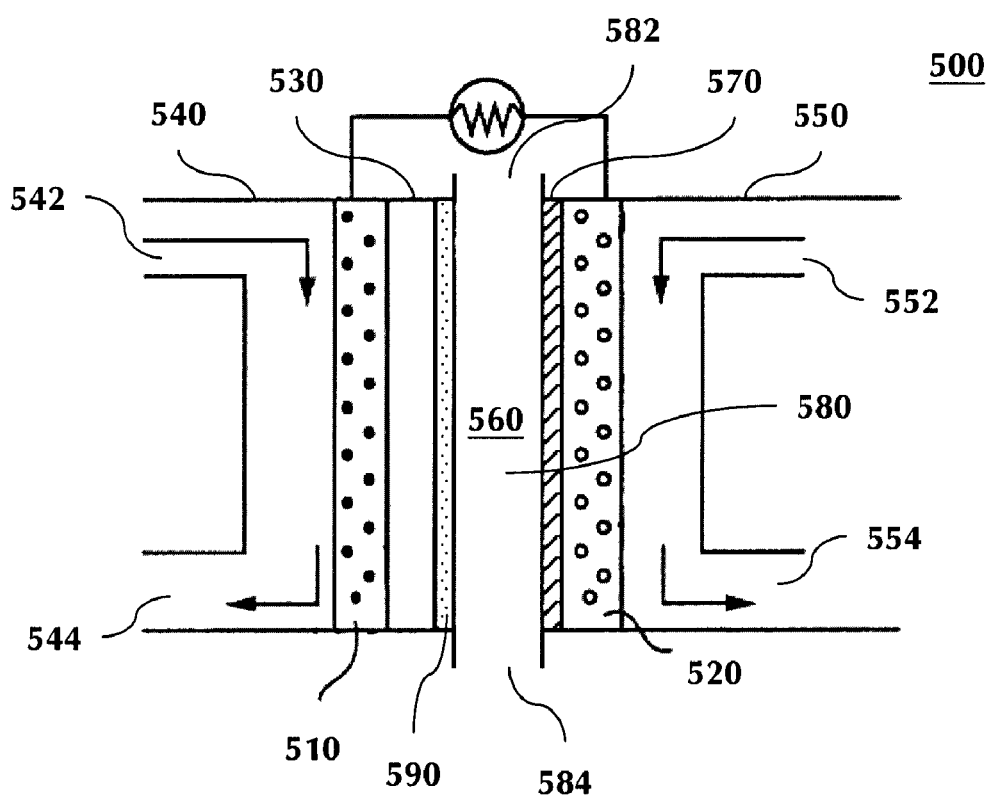
FIG. 5 is a schematic representation of a liquid electrolyte electrochemical cell including proton-conducting metal nanoparticles between the anode and cathode.

FIG. 5 represents an example of an electrochemical cell 500 that includes an anode 510, a cathode 520, proton-conducting metal nanoparticles 590, a first electrolyte 530 between the anode and the proton-conducting metal nanoparticles, and a second electrolyte 560 between the proton-conducting metal nanoparticles and the cathode. The anode 510 has first and second surfaces, and the first surface is in contact with the first electrolyte 530. The second surface of anode 510 is in contact with a fuel channel 540, including a fuel inlet 542 and a fuel outlet 544. The cathode 520 has first and second surfaces, and the first surface of cathode 520 may be in contact with optional oxidant channel 550, including an oxidant inlet 552 and optional oxidant outlet 554. The second surface of cathode 520 is in contact with the second electrolyte 560, and optional blocking layer 570 may be present at the second surface. The second electrolyte 560 is a liquid electrolyte and is in a channel 580 between the cathode 520 and the proton-conducting metal nanoparticles 590. The channel 580 optionally may include an electrolyte inlet 582 and an electrolyte outlet 584. The anode, cathode, fuel, proton-conducting metal nanoparticles and optional blocking layer may be as described above for electrochemical cell 200.

The first electrolyte 530 may be a PEM, or it may be a liquid electrolyte within a host material, such as an inorganic network, a non-ionic membrane, or an inorganic/organic composite. The second electrolyte 560 is a liquid electrolyte, which may be any aqueous mixture of ions, as described above for electrochemical cell 200. The liquid electrolyte may be stationary, or it may be transported within the channel 580. The liquid electrolyte 560 may include an oxidant. The liquid electrolyte 560 preferably does not contain a fuel.

The proton-conducting metal nanoparticles 590 may be present in a discrete layer between the first and second electrolytes 530 and 560. The proton-conducting metal nanoparticles may be present in a layer without any other substance, or the nanoparticles may be present in a mixture with a matrix material. The composition of the matrix material may be the same as or different from the composition of the PEM or the host material present in the first electrolyte.

The proton-conducting metal nanoparticles 590 may be present as a mixture with the PEM or host material of the first electrolyte 530 at the interface between the two electrolytes. For example, the proton-conducting metal nanoparticles may be present as a mixture with a material having the same composition as the PEM or host material of the first electrolyte, and the material forming the matrix for the nanoparticles may be integral with the PEM or host material of the first electrolyte. The proton-conducting metal nanoparticles may be present in a discrete region having a uniform concentration of nanoparticles, or the nanoparticles may be present in a concentration gradient.

For proton-conducting metal nanoparticles 590 that are present as a mixture, either with the PEM or host material at the electrolyte-electrolyte interface or with a matrix material, the mixture may contain from 1 to 99 wt % proton-conducting metal nanoparticles. Preferably the mixture contains from 10 to 95 wt % proton-conducting metal nanoparticles, more preferably from 25 to 90 wt % proton-conducting metal nanoparticles, and more preferably from 50 to 85 wt % proton-conducting metal nanoparticles. The proton-conducting metal nanoparticles may be present at a level of at least 0.1 mg/cm$^2$ of the active area of the cathode 520. Preferably the proton-conducting metal nanoparticles may be present at a level of at least 1 mg/cm$^2$, more preferably of at least 1.5 mg/cm$^2$, and more preferably of at least 2 mg/cm$^2$ of the active area of the cathode. Preferably the proton-conducting metal nanoparticles are confined within a region having a thickness of from 0.1 to 10 microns, more preferably of from 0.5 to 10 microns, more preferably of from 0.7 to 7 microns, and more preferably from 1 to 5 microns.

A method of making electrochemical cell 500 may include depositing proton-conducting metal nanoparticles on the PEM or host material of a first electrolyte 530. The depositing proton-conducting metal nanoparticles may include forming an ink containing the proton-conducting metal nanoparticles, as described above for electrochemical cell 200. The anode already may be in contact with the PEM or host material of the first electrolyte, or the anode and first electrolyte may be brought into contact after the nanoparticles have been placed on the PEM or host material of the first electrolyte. Once the ink has been deposited, the nanoparticles may be subjected to heat and/or pressure. This hot pressing may be performed on the combination of the nanoparticles and the PEM or host material of the first electrolyte, or it may be performed on the combination of the anode, the first electrolyte and the nanoparticles. The combined anode, first electrolyte and proton-conducting metal nanoparticles may be combined with a cathode 520 by placing a second electrolyte between the nanoparticles and the cathode.

A method of generating electricity from electrochemical cell 500 may include contacting cathode 520 with an oxidant, and contacting anode 510 with a fuel, where complementary half cell reactions take place at the cathode and the anode. Contacting the cathode with an oxidant may include flowing an oxidant, or a composition including an oxidant, through the optional oxidant channel 550. Contacting the cathode with an oxidant may include flowing an electrolyte 560 through channel 580, where the electrolyte includes an oxidant. Contacting the anode with a fuel may include flowing a fuel, or a composition including a fuel, through the fuel channel 540.

Electrochemical cells that include a first set of proton-conducting metal nanoparticles between the cathode and the anode, but not in contact with the anode, may be used as fuel cells. These fuel cells preferably produce at least 50 milliamps per square centimeter (mA/cm$^2$), more preferably at least 400 mA/cm$^2$, even more preferably at least 1000 mA/cm$^2$, including 100-1000 mA/cm$^2$, 200-800 mA/cm$^2$, and 400-600 mA/cm$^2$. These fuel cells may operate at voltages of from 1.0 to 0.1 volts (V) for single cells. Preferably these fuel cells may operate at voltages of from 0.7 to 0.2 V, and more preferably from 0.5 to 0.25 V for single cells. These fuel cells may utilize parallel, multi-pass serpentine, or other flow field designs at the anode and/or cathode, which may be preferred due to the lower pressure drops and lower operating stoichiometries relative to simple serpentine designs.

Electrochemical cells that include a first set of proton-conducting metal nanoparticles between the cathode and the anode, but not in contact with the anode, may have performance advantages over similar electrochemical cells without the nanoparticles. One possible explanation for these advantages is that the nanoparticles may permit protons to permeate to the cathode, while blocking the transport of fuel to the cathode. The permeation of protons provides the reactant to the cathode that is necessary to complete the cell reaction with the oxidant. Proton-conducting metal nanoparticles in a fuel cell may permit proton conduction both through the nanoparticles and through the space between the nanoparticles. Thus, the proton conductivity and fuel crossover characteristics of the fuel cell may be affected by the amount of material between the nanoparticles, and by the type of this material (for example air, liquid, and/or a matrix material). These electrochemical cells may have tunable performance properties that can be modified by changing the composition of the region of the cell containing the proton-conducting metal nanoparticles.

Proton conduction in a PEM matrix tends to involve electro-osmotic drag, in which solvated protons are transported to the cathode. The solvent around the proton may include water and fuel, depending on the configuration of the fuel cell. Water that is transported to the cathode by electro-osmotic drag can accumulate, contributing to undesirable cathode flooding and loss of fuel cell performance. Fuel that is transported to the cathode results in the undesirable effects of fuel crossover. Thus, a decrease in the amount of PEM matrix present with the nanoparticles may provide for a decrease in both fuel crossover and in cathode flooding. In a similar way, substitution of a PEM with a non-ionic polymer may result in proton conduction occurring almost exclusively through the nanoparticles. If sufficient proton transport can be maintained, the effects of electro-osmotic drag may be decreased or eliminated while also preventing fuel crossover. Undesirable effects of electro-osmotic drag may be further decreased by the presence of a liquid electrolyte between the anode and the cathode.

An individual fuel cell may be incorporated into a module or component, together with support components, to provide a power supply. As a result, it may be useful to provide a power supply implementation using such fuel cells. Examples of support components include fuel and electrolytes, a pump, a blower, a mixing chamber, a reservoir, a valve, a vent, a power converter, a power regulator, a battery power supply and various control components. An active power system including this electrochemical cell technology may include a fuel cell stack, which may be a stack of individual fuel cells such as fuel cells including proton-conducting metal nanoparticles between the cathode and the anode.

This technology may be especially useful in portable and mobile fuel cell systems and other electronic devices, such as in cellular phones, laptop computers, DVD players, televisions, personal data assistants (PDAs), calculators, pagers, hand-held video games, remote controls, cassette players, CD players, radios, audio recorders, video recorders, cameras, navigation systems, and wristwatches. This technology also may be useful in automotive and aviation systems, including systems used in aerospace vehicles.

The following examples are provided to illustrate one or more preferred embodiments of the invention. Numerous variations may be made to the following examples that lie within the scope of the invention.

EXAMPLES

Examples 1-7

Formation of Nanoparticle Inks

Nanoparticle inks were prepared by placing nanoparticles in a sample vial containing a magnetic stir bar. The nanoparticles were either 20 wt % platinum on carbon black (HiSPEC™ 3000; Alfa Aesar; Ward Hill, Mass.), 50 wt % platinum on carbon black (HiSPEC™ 8000; Alfa Aesar), or unsupported palladium black (99.9% metals basis; Alfa Aesar). The nanoparticles were then wetted with water, and optionally with dimethyl acetamide (DMAC).

To this mixture was added one or more polymer solutions. Each ink formulation included a solution of Nafion® in a mixture of water and alcohols, at either 5 wt %, 10 wt % or 15 wt % loading of the polymer. The 5 wt % solution was obtained from Aldrich (Milwaukee, Wis.). The 15 wt % solution was LIQUION® LQ-1115 (Ion Power, Inc.; New Castle, Del.). The 10 wt % solution was obtained by combining the 5 wt % and 15 wt % solutions. In addition, one of the ink formulations included a 10 wt % dispersion of Teflon® in water, which was prepared by diluting a 60 wt % aqueous dispersion of Teflon® (Aldrich).

Each formulation was mixed with magnetic stirring, followed by ultra-sonication for 60 minutes, and then magnetic stirring for 60 minutes. The formulation for each ink is listed in Table 1.

TABLE 1

Nanoparticle Ink Formulations

| | Example No. | | | | | | |
|---|---|---|---|---|---|---|---|
| | 1 | 2 | 3 | 4 | 5 | 6 | 7 |
| Metal | | | | | | | |
| 20% Pt/C (g) | 0.5043 | — | — | — | — | — | — |
| 50% Pt/C (g) | — | 0.2507 | — | 0.2002 | 0.4004 | 0.1010 | — |
| Pd black (g) | — | — | 0.2017 | — | — | — | 0.1013 |
| Solvent | | | | | | | |
| Water (g) | 1.6449 | 0.9975 | 0.5021 | 1.0273 | 2.0092 | 0.5002 | 0.303 |
| DMAC (g) | 0.5236 | — | — | 0.9965 | 0.9987 | 0.4931 | — |
| Polymer | | | | | | | |
| 10% Teflon ® solution (g) | 1.0035 | — | — | — | — | — | — |
| 5% Nafion ® solution (g) | — | — | — | 1.0107 | 2.0078 | 0.5049 | — |
| 10% Nafion ® solution (g) | 2.9912 | 1.5128 | 1.223 | — | — | — | — |
| 15% Nafion ® solution (g) | — | — | — | — | — | — | 0.324 |
| Weight Ratios | | | | | | | |
| Metal:Carbon | 1:4 | 1:1 | — | 1:1 | 1:1 | 1:1 | — |
| Binder:Metal | 1:1.25 | 1:1.7 | 1:1.7 | 1:2 | 1:2 | 1:2 | 1:2 |

Example 8

Fabrication of Cathodes for Electrochemical Testing

A cathode was formed by coating a gas diffusion medium with the ink of Example 1. The gas diffusion medium was a 100% teflonized carbon substrate with a microporous layer on one side and a total thickness of 235 micrometers (Sigracet® 24 CC; SGL Carbon). The ink was applied to the gas diffusion medium with a paint brush and then dried on a hot plate to form a first composite that contained 2.5 mg/cm$^2$ solids, corresponding to a platinum loading of 0.3 mg/cm$^2$.

Figure 6A:
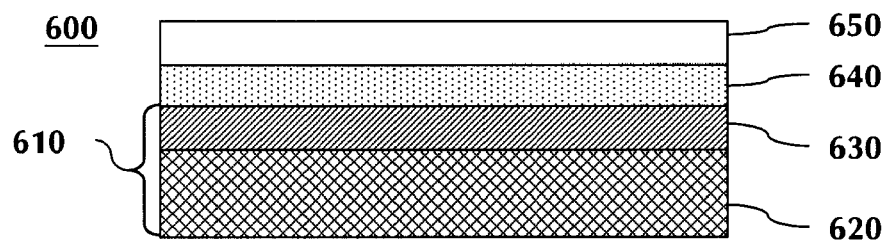
FIG. 6A-6D are schematic representations of cathode structures.

The 5 wt % Nafion® solution used in Examples 1-7 was applied to the composite with a paint brush, followed by drying on a hot plate to form a second composite that contained an additional 0.06 mg/cm² of Nafion®. A Nafion® 111 membrane having an equivalent weight of 1,100 and a thickness of 25 micrometers (Ion Power) was hot pressed to the second composite for 5 minutes at a temperature of 320° F. and a pressure of 115 pounds per square inch (psi). The final cathode (Cathode A) contained platinum catalyst and a Nafion® membrane, but no proton-conducting metal nanoparticles. Cathode A may be represented by FIG. 6A as structure 600, including gas diffusion medium 610 (including GDE 620 and microporous layer 630), platinum catalyst 640, and Nafion® layer 650.

Figure 6B:
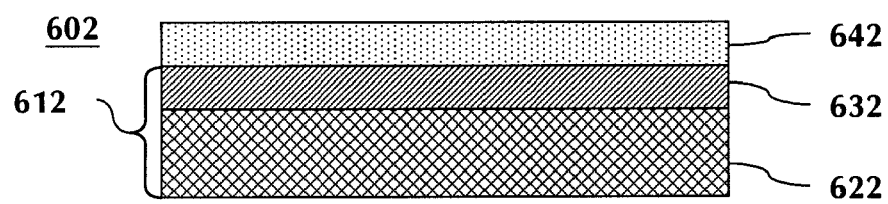

A second cathode was formed using a similar procedure; however, the first composite was made by applying the ink of Example 2 to the gas diffusion medium. The first composite contained 4.18 mg/cm² solids, corresponding to a platinum loading of 1.3 mg/cm². The second composite contained an additional 0.25 g/cm² Nafion®. This cathode was not combined with the Nafion® membrane. The final cathode (Cathode B) contained only platinum catalyst. Cathode B may be represented by FIG. 6B as structure 602, including gas diffusion medium 612 (including GDE 622 and microporous layer 632), and platinum catalyst 642.

Figure 6C:
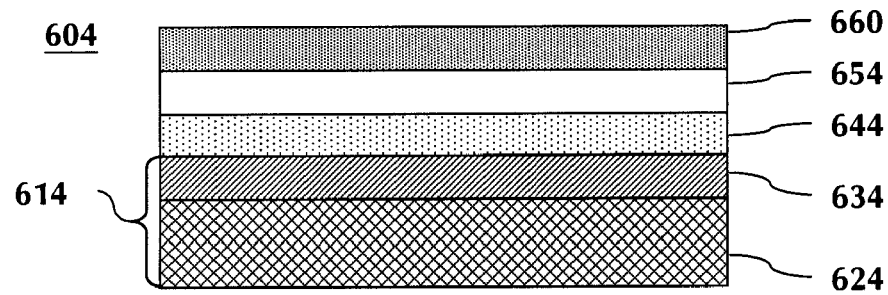

A third cathode was formed by the procedure used for Cathode A. The Nafion® membrane of the cathode was then coated with the ink of Example 3, followed by drying at 320° F. for 5 minutes. The palladium loading of the final cathode (Cathode C) ws measured by weight to be 3.36 mg/cm². The palladium nanoparticles were not electrically coupled to, or in direct contact with, the platinum cathode catalyst. Cathode C may be represented by FIG. 6C as structure 604, including gas diffusion medium 614 (including GDE 624 and microporous layer 634), platinum catalyst 644, Nafion® layer 654, and proton-conducting metal nanoparticles 660.

Example 9

Electrochemical Testing of Cathodes

Figure 7:
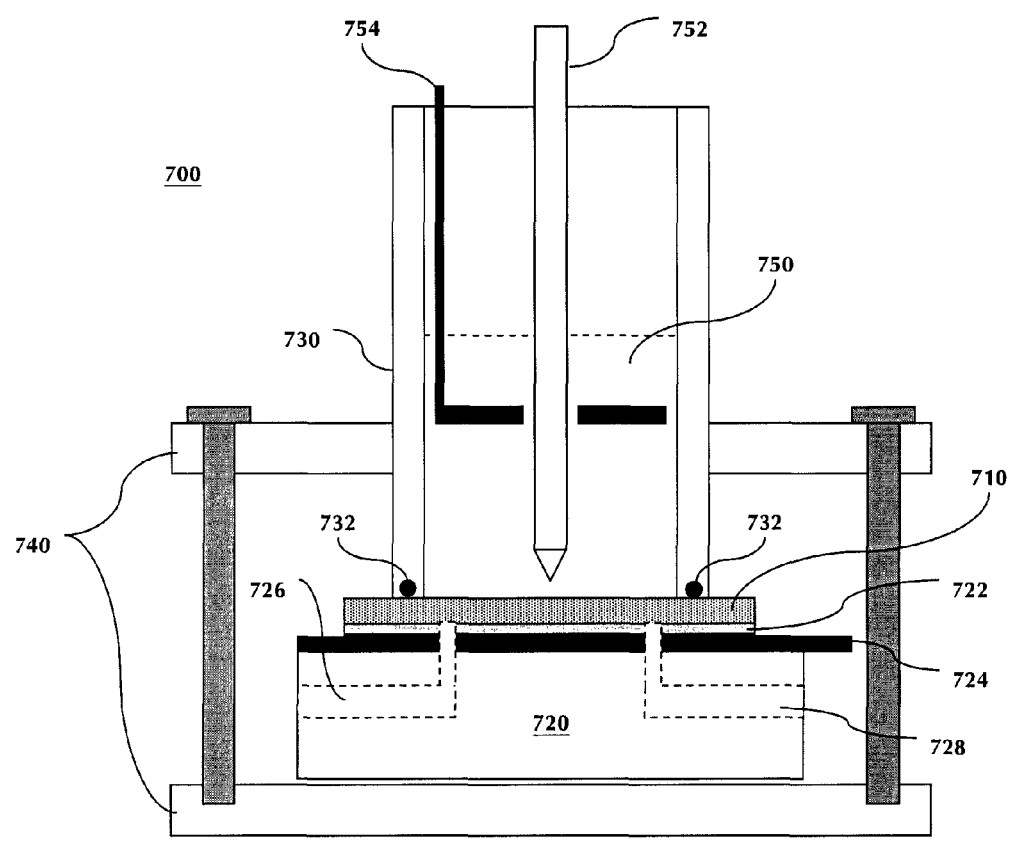
FIG. 7 is a schematic representation of an electrochemical half cell test apparatus.

The cathodes of Example 8 were tested for methanol crossover susceptibility using a static electrochemical half cell apparatus. FIG. 7 represents a schematic view of the electrochemical half cell apparatus 700, in which the cathode 710 was mounted to a flow field block 720 by way of a gasket 722 and an electrical contact layer 724. The flow field block 720 included a gas inlet manifold 726 and a gas outlet manifold 728. The gasket 722 sealed the flow field block 720 to the cathode 710, allowing oxidant gas to flow to and from the cathode by way of the manifolds 726 and 728. An electrolyte chamber 730 was sealed to the cathode by way of an o-ring 732, and the assembly was held in place by a housing 740. An electrolyte 750, a reference electrode 752 and a counter electrode 754 were placed in the electrolyte chamber 730. In the electrochemical half cell apparatus used for the testing, the flow field block 720 was formed from Ultem®, the gasket 722 was made of Kapton®, the electrical contact layer was graphite, the o-ring 732 was made of Viton®, the housing 740 was acrylic.

The test was performed by connecting the cathode 710, reference electrode 752 and counter electrode 754 to a potentiostat (Solartron). A 1 M sulfuric acid electrolyte 750 (25 mL) was placed in the electrolyte chamber 730, and a mercury-mercurous sulfate reference electrode 752 was placed in the electrolyte about 2 mm above the surface of the cathode 710. Stock solutions of methanol in 1 M sulfuric acid were prepared by successive dilution, to provide a wide range of methanol concentrations while keeping the acid concentration constant. A known volume of the appropriate stock was added to the electrolyte chamber to systematically increase the concentration of methanol exposed to the cathode. The stock concentrations were so chosen to effect negligible change in the overall volume of solution in the electrolyte chamber. A platinum-coated niobium mesh counter electrode 754 was also placed in the electrolyte. Once the appropriate solution was in the electrolyte chamber, a flow of pure oxygen was supplied to the cathode through the flow field block 720. The voltage between the reference electrode and the cathode was then measured over time under quiescent electrolyte conditions.

Each cathode was exposed to increasing concentrations of methanol to simulate methanol concentrations that could be seen in a fuel cell. The measured open circuit voltage went through a minimum over time, indicating consumption of the finite amount of methanol available in the electrolyte 750 at the cathode 710. The minimum voltage was due to consumption of methanol at the cathode, and corresponded to the maximum level of methanol cross-over. The voltage minimum was recorded for each methanol concentration.

Figure 8:
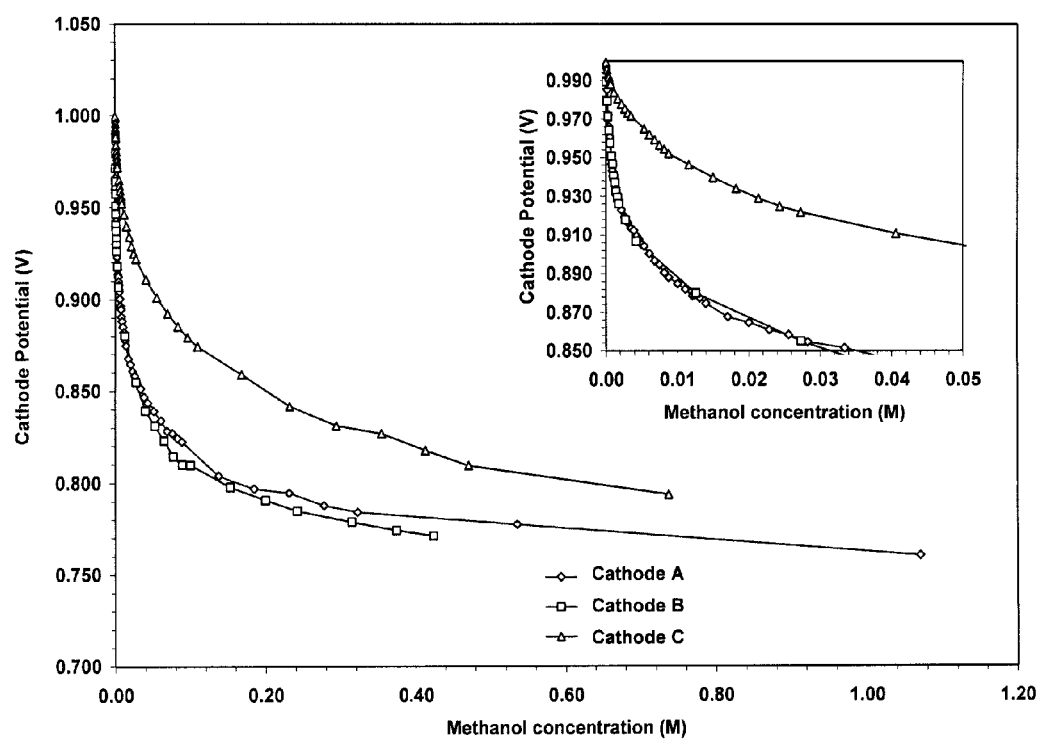
FIG. 8 is a graph of half cell potential as a function of methanol concentration for cathodes with and without proton-conducting metal nanoparticles.

FIG. 8 is a graph of cathode potential as a function of methanol concentration for each cathode. The cathode potential was measured relative to a standard hydrogen electrode (SHE). The presence of the palladium nanoparticles resulted in an increase in cathode potential of approximately 50-80 mV. This improvement was especially evident when low concentrations of methanol were first introduced to the cathode. The addition of a Nafion® membrane via the hot-pressing step did not reduce the rate of methanol crossover, as evidenced by the lack of difference in the open circuit potential (OCV) for the Cathodes A and B. The crossover current at OCV was significantly less for Cathode C, which included the palladium nanoparticles. One possible explanation for this result is that the palladium nanoparticles provided a diffusion barrier layer for methanol transport.

For Cathodes A and C, the electrolyte 750 was replaced with a clean solution of 1 M sulfuric acid electrolyte without methanol, and the cathodes were discharged with the counter electrode 754 to generate oxygen reduction polarization curves. The cathode 710 was held at a known potential with respect to the reference 754, while the current between the working cathode and the counter electrode was monitored.

Figure 9:
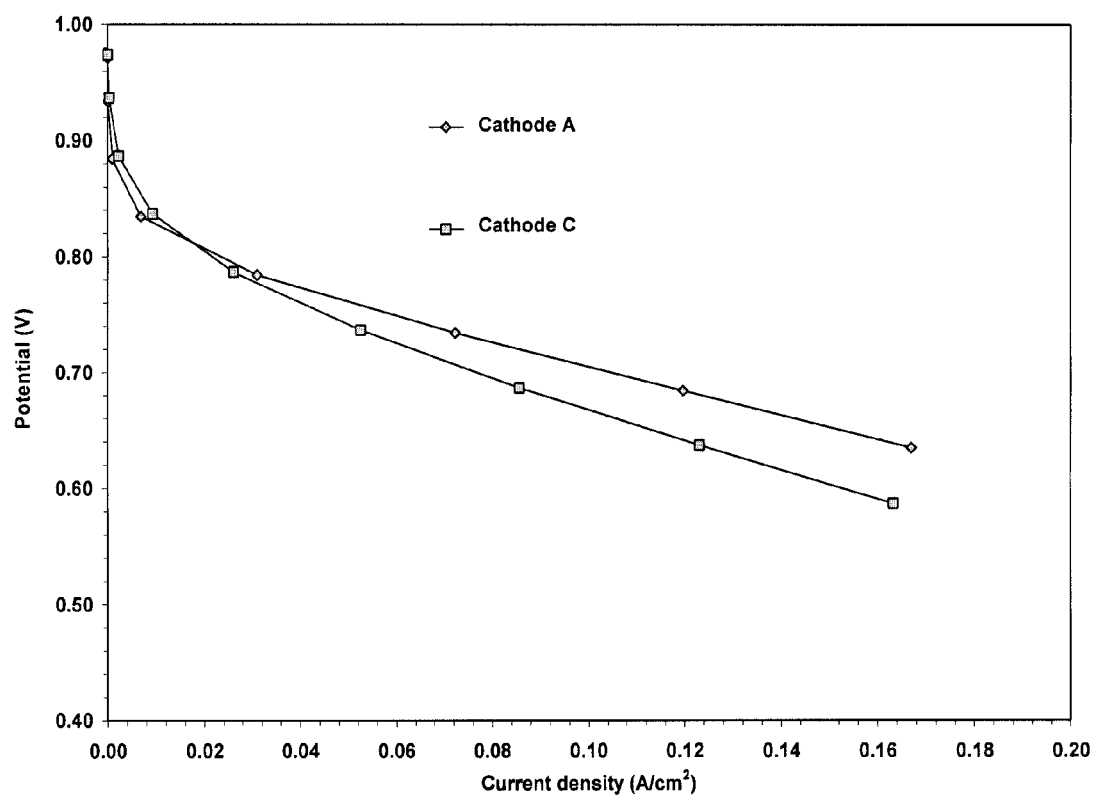
FIG. 9 is a graph of cathode potential as a function of current density for cathodes with and without proton-conducting metal nanoparticles.

FIG. 9 is a graph of the cathode potential as a function of current for Cathodes A and C. Cathode C, containing the palladium nanoparticles, demonstrated a slight improvement in the activation region, while exhibiting higher polarization losses with increasing current density. One possible explanation for the higher polarization losses beyond the activation region is that the added thickness of the nanoparticle layer contributes to increased resistance, and/or that the palladium nanoparticles have proton conductivity behavior that is different from Nafion®.

Example 10

Fabrication of Cathodes for Fuel Cells

Cathodes for fuel cells were formed using a procedure similar to that of Example 8. For Cathode D, the ink of Example 4 was applied to the gas diffusion medium to provide a first composite containing 4.925 mg/cm² solids, corresponding to a platinum loading of 1.97 mg/cm². The second composite was formed by applying a light coat of the 5 wt %

Nafion® solution, followed by drying. The second composite was then hot pressed with the Nafion® membrane.

For Cathode E, the ink of Example 5 was applied to the gas diffusion medium to provide a first composite containing 6.375 mg/cm$^2$ solids, corresponding to a platinum loading of 2.55 mg/cm$^2$. The second composite was formed by applying a light coat of the 5 wt % Nafion® solution, followed by drying. The second composite was then hot pressed with the Nafion® membrane. Cathodes D and E may be represented by FIG. 6A as structure 600, including gas diffusion medium 610 (including GDE 620 and microporous layer 630), platinum catalyst 640, and Nafion® layer 650.

Figure 6D:
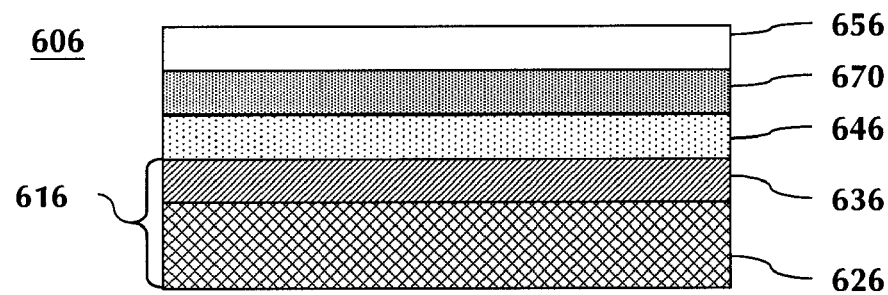

For Cathode F, the ink of Example 6 was applied to the gas diffusion medium to provide a first composite containing 2.41 mg/cm$^2$ solids, corresponding to a platinum loading of 0.964 mg/cm$^2$. The ink of Example 7 was then applied to the composite to provide a second composite that contained 1.3 mg/cm$^2$ palladium, with a Pd:Nafion® ratio of 2:1 and an additional solids loading of 1.96 mg/cm$^2$. A light coat of the 5 wt % Nafion® solution was applied to the second composite and dried to provide a third composite. The Nafion® 111 membrane was then hot pressed to the third composite. In this cathode, the palladium nanoparticles were in contact with and electrically coupled to the platinum catalyst. Cathode F may be represented by FIG. 6D as structure 606, including gas diffusion medium 616 (including GDE 626 and microporous layer 636), platinum catalyst 646, proton-conducting metal nanoparticles 670, and Nafion® layer 656.

Example 11

Fuel Cell Testing of Cathodes

The cathodes of Example 10 were incorporated into microfluidic fuel cells and tested under fuel cell operating conditions. The fuel cell anode was formed by first making a catalyst ink containing Pt/Ru and Nafion® (catalyst to binder 10:1). This ink was painted directly onto a graphite current collector (SGL Carbon), and the coated current collector was hot pressed at 300° F. and 10,000 pounds in a Carver press. A parallel anode flow field for flowing liquid fuel and electrolyte was laser machined from a layer of Kapton FN929. The thickness of the flow field set the anode to cathode surface spacing at 75 micrometers. The flow field was sandwiched between the catalyst sides of the anode and cathode, and the other side of the cathode was contacted with a flow field having 25 channels for flowing gaseous oxidant. This assembly was a single test cell having an active area of 13.2 cm$^2$. The test cell was assembled and held in compression in a Carver press at 3,000 pounds and 25° C. to seal the system and ensure electrical contact.

Figure 10:
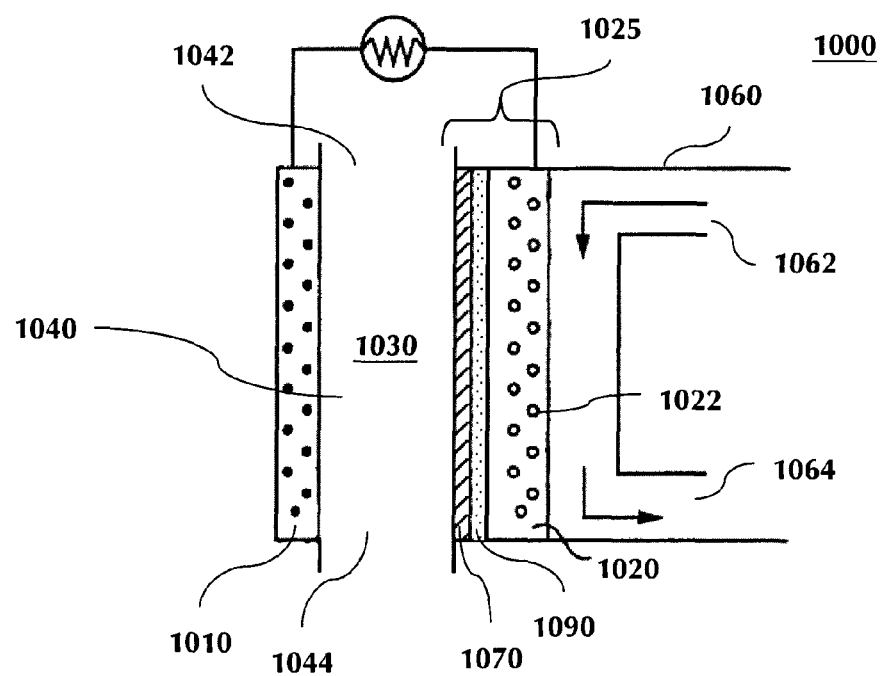
FIG. 10 is a schematic representation of a fuel cell containing proton-conducting metal nanoparticles.

The fuel cell including Cathode D may have been represented by FIG. 10 as structure 1000, including an anode 1010, a cathode assembly 1025, proton-conducting metal nanoparticles 1090, and a channel 1040 between the anode and the proton-conducting metal nanoparticles. The channel 1040 included an inlet 1042, an outlet 1044 and, during operation of the fuel cell, a liquid electrolyte 1030. The anode 1010 was in contact with the channel 1040, and the fuel for reaction at the anode was in the liquid electrolyte 1030. The cathode assembly 1025 had first and second surfaces, with the first surface in contact with oxidant channel 1060, including an oxidant inlet 1062 and an oxidant outlet 1064. The second surface of cathode assembly 1025 was in contact with the channel 1040. The cathode assembly 1025 included a gas diffusion electrode cathode 1020, cathode catalyst 1022, proton-conducting metal nanoparticles 1090, and a Nafion® blocking layer 1070.

Figure 11:
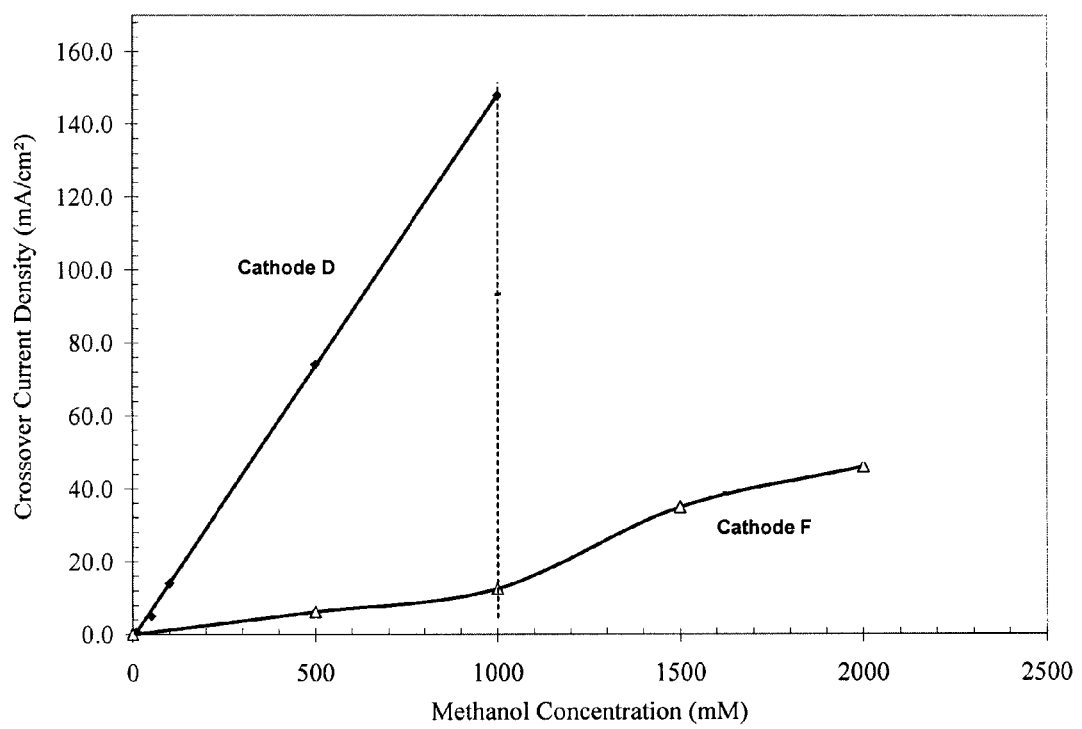
FIG. 11 is a graph of methanol crossover current density at open circuit potential (OCV) as a function of methanol concentration for fuel cells with and without proton-conducting metal nanoparticles.

The fuel cells were tested by determining the methanol crossover current density as a function of methanol fuel concentration in the flowing electrolyte, and as a function of cell current density. FIG. 11 is a graph of methanol crossover current density as a function of methanol concentration for a fuel cell containing Cathode D and for a fuel cell containing Cathode F. For each test cell, a series of 1M sulfuric acid solutions with varying concentrations of methanol (0.5M, 1M, 1.5M and 2M) were pumped at 4 mL/min into the cell and held at open circuit voltage (OCV). After allowing the system to stabilize for ten minutes, measurements of % $CO_2$ in the cathode effluent were recorded on a Horriba VA-3000 gas analyzer. Methanol crossover was then calculated from the $CO_2$ content of the cathode outflow gas according to the method described in R. Jiang, D. Chu, *Electrochemical and Solid-State Letters*, 5 (7) A156-A159 (2002). The fuel cell with Cathode F, containing palladium nanoparticles, exhibited a drastic decrease in methanol crossover relative to the fuel cell with Cathode D, without palladium nanoparticles. The crossover current density at OCV was believed to be due primarily to the diffusion of the methanol, since no electrical load was being applied to drive the system. Thus, it is likely that the decrease in methanol crossover was due to a reduction in methanol diffusion or in the diffusive cross-sectional area, which is consistent with the results observed in the tests of Example 9.

Figure 12:
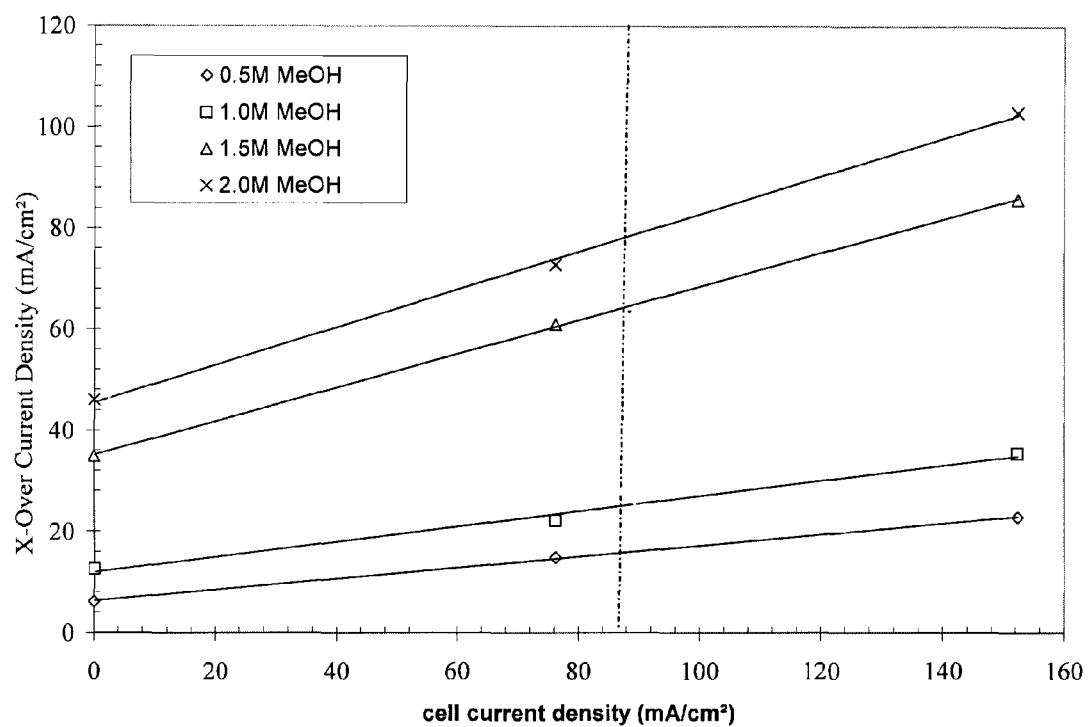
FIG. 12 is a graph of methanol crossover current density as a function of cell current density for a fuel cell containing proton-conducting metal nanoparticles.

FIG. 12 is a graph of methanol crossover current density as a function of cell current density for a fuel cell containing Cathode F at different concentrations of methanol in the electrolyte stream. A series of 1M sulfuric acid solutions with varying concentrations of methanol (0.5M, 1M, 1.5M and 2M) were pumped at 4 mL/min into the test cell, and the oxygen flow was set to 0.5 L/min. A load of 0, (OCV) 1, or 2 amps was applied on the system and monitored on a Scribner 890CL test station. The current steps at each fuel concentration were held constant, allowing the system to stabilize for ten minutes. Measurements of % $CO_2$ in the cathode effluent were recorded, and methanol crossover was calculated from the $CO_2$ content as described above. The positive slope of each line was believed to be due to the combination of diffusion, convective transport (electro-osmotic drag and pressure driven flow) and $CO_2$ crossover from $CO_2$ bubbles generated at the anode. Once the $CO_2$ crossover is corrected, the slope should be only slightly positive or negative, as disclosed in R. Jiang, D. Chu, *Electrochemical and Solid-State Letters*, 5 (7) A156-A159 (2002). The cross-over rate varied, both at OCV and under load, in a non-linear fashion at methanol concentrations above 1M. This result indicates that a higher methanol concentration caused a morphological change or a swelling in the barrier layer, increasing the diffusional cross-sectional area for methanol transport.

Figure 13:
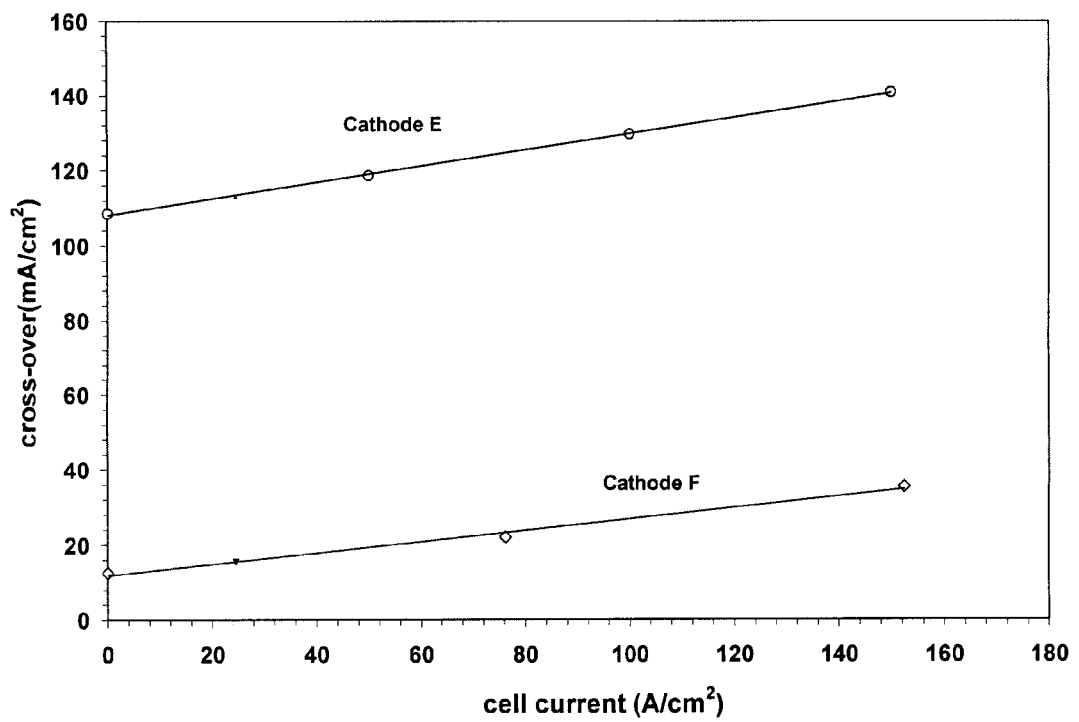
FIG. 13 is a graph of methanol crossover current density as a function of cell current density for a fuel cells with and without proton-conducting metal nanoparticles.

FIG. 13 compares methanol crossover rates for a test cell having a cathode that includes palladium nanoparticles (Cathode F) and for a test cell having a cathode that does not include palladium nanoparticles (Cathode E). The test cells were operated with a constant fuel concentration of 1 M methanol in 1 M sulfuric acid, with a flow rate of 4 mL/min in the test cell. The oxygen flow was set to 0.5 L/min. A load of from 0 to 4 amps was applied, and the system was monitored with a Scribner 890CL test station. The current steps at for each cathode were held constant, allowing the system to stabilize for ten minutes. Measurements of % $CO_2$ in the cathode effluent were recorded, and the methanol crossover was calculated from the $CO_2$ content of the cathode outflow gas. With correction of $CO_2$ crossover, the slope should be only slightly positive or negative. The methanol crossover for the test cell that included palladium nanoparticles was decreased by approximately 10-fold relative to the test cell that did not include palladium nanoparticles. This decrease in crossover occurred both at OCV and as an electrical load was applied to the cells.

Figure 14:
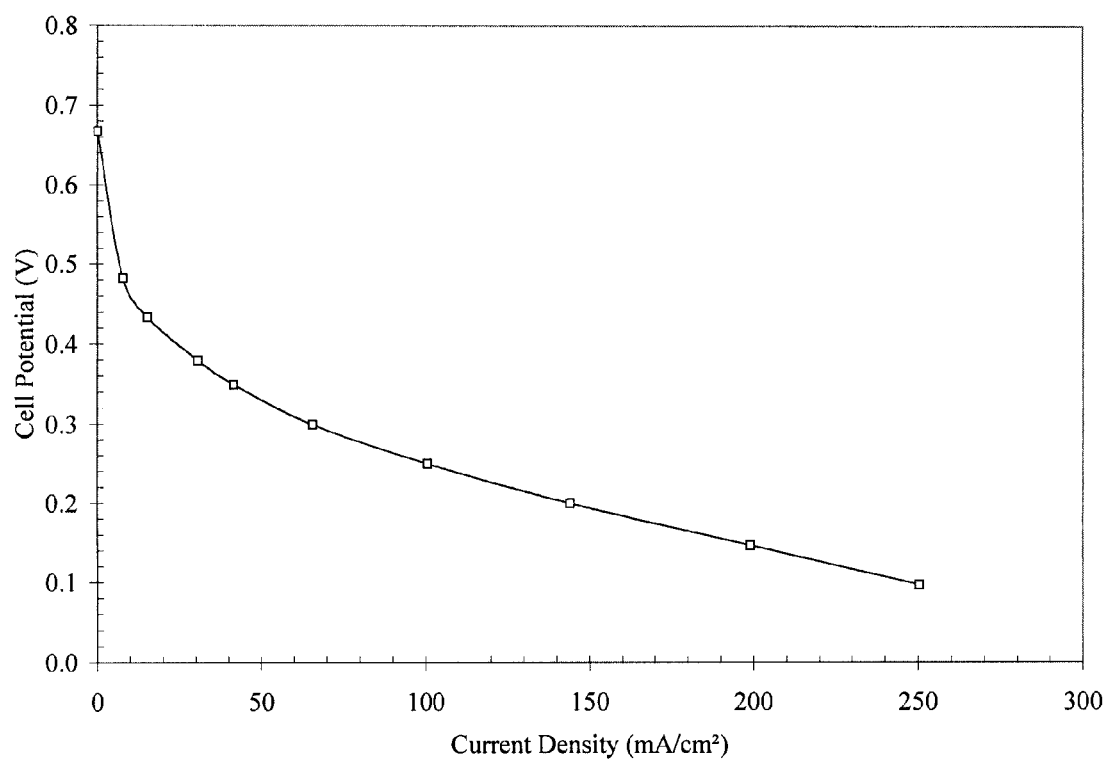
FIG. 14 is a graph of a polarization curve for a fuel cell containing proton-conducting metal nanoparticles.

FIG. 14 is a graph of cell potential as a function of current for the fuel cell containing Cathode F. The fuel cell was operated at room temperature, with oxygen as the oxidant. A 1M sulfuric acid solution containing 1 M methanol was pumped at 4 mL/min into the test cell, and the oxygen flow was set to 0.5 L/min. A load was applied, and the system was monitored with a Scribner 890CL test station. Under these conditions, there was no evidence of flooding of the cathode at a current density of up to 250 mA/cm$^2$. The overall cell resistance varied from 200-250 milliOhms/cm$^2$ at low and high currents. For this fuel cell, the cross-over was reduced by a factor of 10, and the overall cell resistance increased only by a factor of 1.3 relative to a fuel cell without palladium nanoparticles. This indicates that the palladium nanoparticles provided a perm-selective barrier layer through which there was adequate proton conduction to allow for reasonable fuel cell performance with minimal fuel cross-over.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:

1. An electrochemical cell, comprising:
   an anode comprising an anode catalyst,
   a cathode comprising a cathode catalyst, and
   a first set of proton-conducting metal nanoparticles between the anode and the cathode;
   where the first set of proton-conducting metal nanoparticles comprises palladium and is not in contact with the anode with the proviso that the first set of proton-conducting metal nanoparticles does not include platinum,
   the cathode further comprises a gas diffusion electrode,
   the cathode catalyst is directly on the gas diffusion electrode, and
   the first set of proton-conducting metal nanoparticles is directly on the cathode catalyst.

2. The electrochemical cell of claim 1, where the first set of proton-conducting metal nanoparticles is present at a level of at least 0.1 mg/cm$^2$ of an active area of the cathode.

3. The electrochemical cell of claim 1, where the first set of proton-conducting metal nanoparticles further comprises at least one metal selected from the group consisting of vanadium, niobium, tantalum, titanium, and nickel alloys.

4. The electrochemical cell of claim 1, further comprising at least one element between the anode and the first set of proton-conducting metal nanoparticles,
   where the element is selected from the group consisting of a channel, a polymer electrolyte membrane, and a liquid electrolyte in a host material.

5. The electrochemical cell of claim 1, further comprising a channel between the anode and the first set of proton-conducting metal nanoparticles,
   the channel comprising at least one inlet and at least one outlet.

6. The electrochemical cell of claim 1, further comprising a polymer electrolyte membrane between the anode and the first set of proton-conducting metal nanoparticles.

7. The electrochemical cell of claim 6, further comprising a channel between the first set of proton-conducting metal nanoparticles and the cathode,
   the channel comprising at least one inlet and at least one outlet.

8. The electrochemical cell of claim 7, further comprising a liquid electrolyte in the channel.

9. The electrochemical cell of claim 1, where at least 90 weight percent of the transition metal content of the first set of proton-conducting metal nanoparticles is palladium.

10. An electrochemical cell, comprising:
    an anode comprising an anode catalyst,
    a cathode comprising a cathode catalyst,
    a first set of proton-conducting metal nanoparticles between the anode and the cathode; and
    a matrix material directly on the cathode catalyst,
    where the first set of proton-conducting metal nanoparticles comprises palladium and is not in contact with the anode with the proviso that the first set of proton-conducting metal nanoparticles does not include platinum,
    the cathode further comprises a gas diffusion electrode,
    the cathode catalyst is directly on the gas diffusion electrode, and
    the first set of proton-conducting metal nanoparticles is present as a mixture with the matrix material.

11. The electrochemical cell of claim 10, where the matrix material comprises a material selected from the group consisting of an inorganic network, an organic network, a membrane, and combinations thereof.

12. The electrochemical cell of claim 10, where at least 90 weight percent of the transition metal content of the proton-conducting metal nanoparticles is palladium.

13. A method of making the electrochemical cell of claim 1, comprising:
    placing the first set of proton-conducting metal nanoparticles between the anode and the cathode.
    placing the first set of proton-conducting metal nanoparticles on at least one of the cathode, the polymer electrolyte membrane, or the host material.

14. A method of generating electricity from the electrochemical cell of claim 1, comprising:
    contacting the cathode with an oxidant, and
    contacting the anode with a fuel,
    where complementary half cell reactions take place at the cathode and the anode.

15. A method of generating electricity from the electrochemical cell of claim 10, comprising:
    contacting the cathode with a flow of gaseous oxidant,
    flowing a liquid electrolyte through the channel, and
    contacting the anode with a fuel,
    where complementary half cell reactions take place at the cathode and the anode.

* * * * *

UNITED STATES PATENT AND TRADEMARK OFFICE
CERTIFICATE OF CORRECTION

PATENT NO. : 8,158,300 B2  
APPLICATION NO. : 11/533210  
DATED : April 17, 2012  
INVENTOR(S) : Larry J. Markoski et al.

It is certified that error appears in the above-identified patent and that said Letters Patent is hereby corrected as shown below:

Title page

Page 3, Item (56) References Cited

Column 1, Line 28, please delete "Naifion" and insert --Nafion--
Column 1, Line 31, please delete "Naifion" and insert --Nafion--
Column 1, Line 67, please delete "Halliday." and insert --Halliday--
Column 2, Line 1, please delete "cm$_2$" and insert --cm$^2$--
Column 2, Line 3, please delete "Naifon" and insert --Nafion--
Column 2, Line 7, please delete "nd" and insert --and--

Page 4, Item (56) References Cited

Column 1, Line 27, please delete "YBa$_2$Cu$_3$O$_7$---" and insert --YBa$_2$Cu$_3$O$_{7-*}$--
Column 2, Line 55, please delete "Findamentals" and insert --Fundamentals--

Page 5, Item (56) References Cited

Column 1, Line 15, please delete "and fuel cell" and insert --and "fuel cell"--
Column 1, Line 17, please delete "fuel cell and oxygen carrier and "perfluror"" and insert --"fuel cell and oxygen carrier" and "perfluor"--
Column 1, Line 21, please delete ""perflurocarbons"" and insert --"perfluorocarbons"--
Column 1, Line 27, please delete "et at, °Solubility" and insert --et al., Solubility--
Column 2, Line 52, please delete "A. J." and insert --J.--
Column 2, Line 68, please delete "Lagmuir" and insert --Langmuir--

Page 6, Item (56) Reference Cited

Column 2, Line 11, please delete "Power of Sources" and insert --Power Sources--

Signed and Sealed this  
Fifteenth Day of December, 2015

Michelle K. Lee  
*Director of the United States Patent and Trademark Office*

CERTIFICATE OF CORRECTION (continued)
U.S. Pat. No. 8,158,300 B2

In the Claims

Column 24, lines 40 through 42, please delete all the text beginning with "placing the first set" and ending with "or the host material."